United States Patent
Pan et al.

(10) Patent No.: US 10,411,264 B2
(45) Date of Patent: Sep. 10, 2019

(54) CATHODE ACTIVE MATERIAL LAYER FOR LITHIUM SECONDARY BATTERY AND METHOD OF MANUFACTURING

(71) Applicant: Nanotek Instruments, Inc., Dayton, OH (US)

(72) Inventors: Baofei Pan, Dayton, OH (US); Hui He, Dayton, OH (US); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 0 days.

(21) Appl. No.: 15/442,807

(22) Filed: Feb. 27, 2017

(65) Prior Publication Data

US 2018/0248190 A1    Aug. 30, 2018

(51) Int. Cl.
| | |
|---|---|
| H01M 4/62 | (2006.01) |
| H01M 10/0525 | (2010.01) |
| H01M 4/36 | (2006.01) |
| H01M 4/13 | (2010.01) |
| H01M 4/139 | (2010.01) |

(52) U.S. Cl.
CPC ............ *H01M 4/622* (2013.01); *H01M 4/13* (2013.01); *H01M 4/139* (2013.01); *H01M 4/366* (2013.01); *H01M 4/625* (2013.01); *H01M 10/0525* (2013.01); *Y02T 10/7011* (2013.01)

(58) Field of Classification Search
CPC .............................. H01M 4/625; H01M 4/587
See application file for complete search history.

(56) References Cited

U.S. PATENT DOCUMENTS

| | | |
|---|---|---|
| 2,798,878 A | 7/1957 | Hummers |
| 5,350,647 A | 9/1994 | Hope et al. |
| 5,434,021 A | 7/1995 | Fauteux et al. |
| 5,536,599 A | 7/1996 | Alamgir et al. |
| 5,648,187 A | 7/1997 | Skotheim |
| 5,961,672 A | 10/1999 | Skotheim et al. |

(Continued)

FOREIGN PATENT DOCUMENTS

WO    2017172104 A1    10/2017

OTHER PUBLICATIONS

An et al., "Diameter-Selected Synthesis of Single Crystalline Trigonal Selenium Nanowires" Materials Chemistry and Physics (2007) vol. 101, No. 2-3, pp. 357-361.

(Continued)

*Primary Examiner* — Olatunji A Godo

(57) ABSTRACT

Provided is a cathode active material layer for a lithium battery. The cathode active material layer comprises multiple particulates of a cathode active material, wherein a particulate is composed of one or a plurality of cathode active material particles being fully embraced or encapsulated by a thin layer of a high-elasticity polymer having a recoverable tensile strain from 2% to 700% (preferably from 5% to 500%) when measured without an additive or reinforcement, a lithium ion conductivity no less than $10^{-5}$ S/cm (preferably and typically from $1.0 \times 10^{-5}$ S/cm to $5 \times 10^{-2}$ S/cm) at room temperature, and a thickness from 0.5 nm (essentially a molecular monolayer) to 10 μm (preferably from 1 nm to 100 nm).

46 Claims, 10 Drawing Sheets

(56) References Cited

U.S. PATENT DOCUMENTS

| | | | |
|---|---|---|---|
| 6,025,094 | A | 2/2000 | Visco et al. |
| 6,447,952 | B1 | 9/2002 | Spiegel et al. |
| 6,733,924 | B1 | 5/2004 | Skotheim et al. |
| 6,797,428 | B1 | 9/2004 | Skotheim et al. |
| 6,936,381 | B2 | 8/2005 | Skotheim et al. |
| 7,247,408 | B2 | 7/2007 | Skotheim et al. |
| 7,282,295 | B2 | 10/2007 | Visco et al. |
| 7,282,296 | B2 | 10/2007 | Visco et al. |
| 7,282,302 | B2 | 10/2007 | Visco et al. |
| 2003/0180619 | A1 | 9/2003 | Tamura et al. |
| 2004/0018430 | A1 | 1/2004 | Holman et al. |
| 2005/0118508 | A1* | 6/2005 | Yong ............... H01M 2/1673 429/246 |
| 2005/0136330 | A1 | 6/2005 | Mao et al. |
| 2008/0248393 | A1 | 10/2008 | Richard et al. |
| 2009/0169725 | A1 | 7/2009 | Zhamu et al. |
| 2010/0143798 | A1 | 6/2010 | Zhamu et al. |
| 2010/0173198 | A1 | 7/2010 | Zhamu et al. |
| 2011/0244337 | A1 | 10/2011 | Ohta et al. |
| 2012/0088154 | A1 | 4/2012 | Liu et al. |
| 2013/0171339 | A1 | 7/2013 | Wang et al. |
| 2013/0224603 | A1 | 8/2013 | Chen et al. |
| 2014/0234702 | A1 | 8/2014 | Zhang et al. |
| 2015/0244025 | A1 | 8/2015 | Rhee et al. |
| 2016/0043384 | A1 | 2/2016 | Zhamu et al. |
| 2016/0126543 | A1 | 5/2016 | Ota et al. |
| 2017/0062830 | A1 | 3/2017 | Bao et al. |

OTHER PUBLICATIONS

An et al., "Large-Scale Synthesis of High Quality Trigonal Selenium Nanowires" European Journal of Inorganic Chemistry (2003) vol. 17, pp. 3250-3255.

Arai et al., "Versatile supramolecular cross-linker: a rotaxane cross-linker that directly endows vinyl polymers with movable cross-links" Chemistry (2013) vol. 19, pp. 5917-5923.

Buonerba et al., "Novel Synthetic Strategy for the Sulfonation of Polybutadiene and Styrene-Butadiene Copolymers" Macromolecules (2013) vol. 46, pp. 778-784.

Chen et al., "Selenium nanowires and nanotubes synthesized via a facile template-free solution method" Materials Research Bulletin (2010) vol. 45, pp. 699-704.

Dwivedi et al., "An Organic Acid-induced Synthesis and Characterization of Selenium Nanoparticles" Journal of Nanotechnology (2011) Article ID 651971, 6 pages.

Elabd et al., "Sulfonation and Characterization of Poly(styrene-isobutylene-styrene) Triblock Copolymers at High Ion-Exchange Capacities" Polymer (2004) vol. 45, pp. 3037-3043.

Fan et al., "Hollow selenium encapsulated into 3D graphene hydrogels for lithium-selenium batteries with high rate performance and cycling stability" RSC Adv. (2017) vol. 7, pp. 21281-21286.

Gao et al., "Hollow Sphere Selenium Nanoparticles: Their In-Vitro Anti Hydroxyl Radical Effect" Advanced Materials (2002), vol. 14, No. 4, pp. 290-293.

Ji et al., "A highly ordered nanostructured carbon-sulphur cathode for lithium-sulphur batteries" Nature Materials (2009) vol. 8, pp. 500-506.

Karlicky et al., "Halogenated Graphenes: Rapidly Growing Family of Graphene Derivatives" ACS Nano (2013) vol. 7, No. 8, pp. 6434-6464.

Li et al., "Mixed Surfactant Template Method for Preparation of Nanometer Selenium" E-Journal of Chemistry (2009) vol. 6, No. S1, pp. S304-S310.

Lin et al., "Observation in the Growth of Selenium Nanoparticles" Journal of Chinese Chemical Society (2004) vol. 51, No. 2, pp. 239-242.

Luesakul et al., "Shape-controlled synthesis of cubic-like selenium nanoparticles via the self-assembly method" Carbohydrate Polymers (2016) vol. 153, pp. 435-444.

PCT/US17/18452 International Search Report and Written Opinion dated Apr. 25, 2017, 9 pages.

PCT/US18/16404 International Search Report and Written Opinion dated Apr. 13, 2018, 11 pages.

PCT/US18/16410 International Search Report and Written Opinion dated Apr. 20, 2018, 10 pages.

PCT/US18/16418 International Search Report and Written Opinion dated Apr. 25, 2018, 9 pages.

PCT/US18/16423 International Search Report and Written Opinion dated Apr. 24, 2018, 9 pages.

PCT/US18/16426 International Search Report and Written Opinion dated Apr. 24, 2018, 9 pages.

PCT/US18/20892 International Search Report and Written Opinion dated May 2, 2018, 6 pages.

Xie et al., "A Novel Method for Synthesis of Sulfonated SBS Ionomers by Ring-Opening Reaction of Epoxidized SBS, Their Characterization, Properties, and Blends" Journal of Elastomers and Plastics (2007) vol. 39, pp. 317-334.

Zeng et al., "Solvothermal synthesis of trigonal selenium with butterfly-like microstructure" Particuology (2013) vol. 11, No. 5, pp. 614-617.

Zhang et al., "Synthesis of selenium nanoparticles in the presence of polysaccharides" Materials Letters (2004) vol. 58, No. 21, pp. 2590-2594.

PCT/US18/16431 International Search Report and Written Opinion dated Apr. 26, 2018, 6 pages.

* cited by examiner

CATHODE ACTIVE MATERIAL LAYER FOR LITHIUM SECONDARY BATTERY AND METHOD OF MANUFACTURING

FIELD OF THE INVENTION

The present invention relates generally to the field of rechargeable lithium battery and, more particularly, to the lithium battery cathode active material, cathode layer, and battery cell, and a method of manufacturing same.

BACKGROUND OF THE INVENTION

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the anode layer is used to bond the anode active material (e.g. graphite or Si particles) and a conductive filler (e.g. carbon black particles or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode active material layer (or, simply, anode layer) and the latter one forms another discrete layer (current collector layer).

A binder resin (e.g. PVDF or PTFE) is also used in the cathode to bond cathode active materials and conductive additive particles together to form a cathode active layer of structural integrity. The same resin binder also acts to bond this cathode active layer to a cathode current collector (e.g. Al foil).

Historically, lithium-ion batteries actually evolved from rechargeable "lithium metal batteries" that use lithium (Li) metal as the anode and a Li intercalation compound (e.g. $MoS_2$) as the cathode. Li metal is an ideal anode material due to its light weight (the lightest metal), high electronegativity (−3.04 V vs. the standard hydrogen electrode), and high theoretical capacity (3,860 mAh/g). Based on these outstanding properties, lithium metal batteries were proposed 40 years ago as an ideal system for high energy-density applications.

Due to some safety concerns (e.g. lithium dendrite formation and internal shorting) of pure lithium metal, graphite was implemented as an anode active material in place of the lithium metal to produce the current lithium-ion batteries. The past two decades have witnessed a continuous improvement in Li-ion batteries in terms of energy density, rate capability, and safety. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power (power density <0.5 kW/kg), and necessity to use pre-lithiated cathodes (e.g. lithium cobalt oxide, as opposed to cobalt oxide), thereby limiting the choice of available cathode materials.

Further, these commonly used cathode active materials have a relatively low specific capacity (typically <220 mAh/g). These factors have contributed to the two major shortcomings of today's Li-ion batteries—a low energy density (typically 150-220 $Wh/kg_{cell}$) and low power density (typically <0.5 kW/kg). In addition, even though the lithium metal anode has been replaced by an intercalation compound (e.g. graphite) and, hence, there is little or no lithium dendrite issue in the lithium-ion battery, the battery safety issue has not gone away. There have been no short of incidents involving lithium-ion batteries catching fire or exploding. To sum it up, battery scientists have been frustrated with the low energy density, inadequate cycle life, and flammability of lithium-ion cells for over three decades!

There have been tremendous efforts made in battery industry and research community to improve existing cathode materials and develop new cathode compositions. However, current and emerging cathode active materials for lithium secondary batteries still suffer from the following serious drawbacks:

(1) The most commonly used cathode active materials (e.g. lithium transition metal oxides) contain a transition metal (e.g. Fe, Mn, Co, Ni, etc.) that is a powerful catalyst that can promote undesirable chemical reactions inside a battery (e.g. decomposition of electrolyte). These cathode active materials also contain a high oxygen content that could assist in the progression of thermal runaway and provide oxygen for electrolyte oxidation, increasing the danger of explosion or fire hazard. This is a serious problem that has hampered the widespread implementation of electric vehicles.

(2) Most of promising organic or polymeric cathode active materials are either soluble in the commonly used electrolytes or are reactive with these electrolytes. Dissolution of active material in the electrolyte results in a continuing loss of the active material. Undesirable reactions between the active material and the electrolyte lead to graduate depletion of the electrolyte and the active material in the battery cell. All these phenomena lead to capacity loss of the battery and shortened cycle life.

(3) The practical capacity achievable with current cathode materials (e.g. lithium iron phosphate and lithium transition metal oxides) has been limited to the range of 150-250 mAh/g and, in most cases, less than 200 mAh/g. Additionally, emerging high-capacity cathode active materials (e.g. $FeF_3$) still cannot deliver a long battery cycle life.

High-capacity cathode active materials, such as metal fluoride, metal chloride, and lithium transition metal silicide, can undergo large volume expansion and shrinkage during the discharge and charge of a lithium battery. These repeated volume changes lead to structural instability of the cathode, breakage of the normally weak bond between the binder resin and the active material, fragmentation of active material particles, delamination between the cathode active material layer and the current collector, and interruption of electron-conducting pathways. These high-capacity cathodes include $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, etc. High-capacity cathode active materials also include a lithium transition metal silicate, $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and x+y≤1.

Hence, there is an urgent and continuing need for a new cathode active material and a cathode active material layer that enable a lithium secondary battery to deliver a long cycle life and higher energy density. There is also a need for a method of readily and easily producing such a material in large quantities. Thus, it is a primary object of the present invention to meet these needs and address the issues associated the rapid capacity decay of a lithium battery.

SUMMARY OF THE INVENTION

Herein reported is a cathode active material layer for a lithium battery that contains a very unique class of cathode active material. Specifically, the cathode active material particles are fully embraced or encapsulated by a high-elasticity polymer that is capable of overcoming the rapid capacity decay problem commonly associated with a rechargeable lithium battery.

The instant invention is directed at a lithium-ion battery (using a lithium intercalation compound or conversion-type compound, not lithium metal, as the anode active material) or a lithium metal battery (using lithium metal as the anode active material and a lithium intercalation or conversion compound as the cathode active material, but not including sulfur or alkali metal polysulfide). Both alkali metal-sulfur cells (Li—S, Na—S, and K—S) and the lithium-air cell are excluded from the claims.

In a preferred embodiment, the invention provides a cathode active material layer for a lithium battery, preferably a rechargeable battery. The cathode active material layer comprises multiple particulates of a cathode active material, wherein a particulate is composed of one or a plurality of cathode active material particles being fully embraced or encapsulated by a thin layer of a high-elasticity polymer having a recoverable tensile strain from 5% to 700% when measured without an additive or reinforcement, a lithium ion conductivity no less than $10^{-5}$ S/cm at room temperature, and a thickness from 0.5 nm to 10 μm. When measured with an additive or reinforcement in the polymer, the tensile elastic deformation of the resulting composite must remain greater than 2%. The polymer also has a lithium ion conductivity no less than $10^{-5}$ S/cm at room temperature (preferably and more typically no less than $10^{-4}$ S/cm and more preferably and typically no less than $10^{-3}$ S/cm).

High-elasticity polymer refers to a polymer, typically a lightly cross-linked polymer, which exhibits an elastic deformation that is at least 2% (preferably at least 5%) when measured under uniaxial tension. In the field of materials science and engineering, the "elastic deformation" is defined as a deformation of a material (when being mechanically stressed) that is essentially fully recoverable upon release of the load and the recovery process is essentially instantaneous (no or little time delay). The elastic deformation is more preferably greater than 10%, even more preferably greater than 30%, further more preferably greater than 50%, and still more preferably greater than 100%.

In some preferred embodiments, the high-elasticity polymer contains a lightly cross-linked network of polymer chains having an ether linkage, nitrile-derived linkage, benzo peroxide-derived linkage, ethylene oxide linkage, propylene oxide linkage, vinyl alcohol linkage, cyano-resin linkage, triacrylate monomer-derived linkage, tetraacrylate monomer-derived linkage, or a combination thereof, in the cross-linked network of polymer chains. These network or cross-linked polymers exhibit a unique combination of a high elasticity (high elastic deformation strain) and high lithium-ion conductivity.

In certain preferred embodiments, the high-elasticity polymer contains a lightly cross-linked network polymer chains selected from nitrile-containing polyvinyl alcohol chains, cyanoresin chains, pentaerythritol tetraacrylate (PETEA) chains, pentaerythritol triacrylate chains, ethoxylated trimethylolpropane triacrylate (ETPTA) chains, ethylene glycol methyl ether acrylate (EGMEA) chains, or a combination thereof.

The cathode active material layer contains a cathode active material selected from an inorganic material, an organic material, a polymeric material, or a combination thereof. The inorganic material may be selected from a metal oxide, metal phosphate, metal silicide, metal selenide, transition metal sulfide, or a combination thereof. The inorganic material does not include sulfur or alkali metal polysulfide.

The inorganic material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

In certain preferred embodiments, the inorganic material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof. In certain preferred embodiments, the inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and x+y≤1.

In certain preferred embodiments, the inorganic material is selected from a transition metal dichalcogenide, a transition metal trichalcogenide, or a combination thereof. The inorganic material is selected from $TiS_2$, $TaS_2$, $MoS_2$, $NbSe_3$, $MnO_2$, $CoO_2$, an iron oxide, a vanadium oxide, or a combination thereof.

The cathode active material layer may contain a metal oxide containing vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein 0.1<x<5.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from Poly(anthraquinonyl sulfide) (PAQS), a lithium oxocarbon, 3,4,9,10- perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The cathode active material is preferably in a form of nano particle (spherical, ellipsoidal, and irregular shape), nano wire, nano fiber, nano tube, nano sheet, nano belt, nano ribbon, nano disc, nano platelet, or nano horn having a thickness or diameter less than 100 nm. These shapes can be collectively referred to as "particles" unless otherwise specified or unless a specific type among the above species is desired. Further preferably, the cathode active material has a dimension less than 50 nm, even more preferably less than 20 nm, and most preferably less than 10 nm.

In some embodiments, multiple particles are bonded by the high-elasticity polymer-based binder resin. A carbon layer may be deposited to embrace the cathode active material particles prior to being bonded by the resin binder.

The cathode active material layer may further contain a graphite, graphene, or carbon material mixed with the active material particles in the anode active material layer. The carbon or graphite material may be selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof. Graphene may be selected from pristine graphene, graphene oxide, reduced graphene oxide, graphene fluoride, hydrogenated graphene, nitrogenated graphene, functionalized graphene, etc.

The cathode active material particles may be coated with or embraced by a conductive protective coating, selected from a carbon material, graphene, electronically conductive polymer, conductive metal oxide, or conductive metal coating. Preferably, the cathode active material, in the form of a nano particle, nano wire, nano fiber, nano tube, nano sheet, nano belt, nano ribbon, nano disc, nano platelet, or nano horn is pre-intercalated or pre-doped with lithium ions to form a prelithiated anode active material having an amount of lithium from 0.1% to 54.7% by weight of said prelithiated anode active material.

Preferably and typically, the high-elasticity polymer has a lithium ion conductivity no less than $10^{-5}$ S/cm, more preferably no less than $10^{-4}$ S/cm, and most preferably no less than $10^{-3}$ S/cm. Some of the selected polymers exhibit a lithium-ion conductivity greater than $10^{-2}$ S/cm (up to $5\times10^{-2}$ S/cm). In some embodiments, the high-elasticity polymer is a neat polymer containing no additive or filler dispersed therein. In others, the high-elasticity polymer is a polymer matrix composite containing from 0.1% to 50% by weight (preferably from 1% to 35% by weight) of a lithium ion-conducting additive dispersed in a high-elasticity polymer matrix material. In some embodiments, the high-elasticity polymer contains from 0.1% by weight to 10% by weight of a reinforcement nano filament selected from carbon nanotube, carbon nano-fiber, graphene, or a combination thereof.

In some embodiments, the high-elasticity polymer is mixed with an elastomer (to form a blend, co-polymer, or interpenetrating network) selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, the high-elasticity polymer is a composite containing a lithium ion-conducting additive dispersed in a high-elasticity polymer matrix material, wherein the lithium ion-conducting additive is selected from Li$_2$CO$_3$, Li$_2$O, Li$_2$C$_2$O$_4$, LiOH, LiX, ROCO$_2$Li, HCOLi, ROLi, (ROCO$_2$Li)$_2$, (CH$_2$OCO$_2$Li)$_2$, Li$_2$S, Li$_x$SO$_y$, or a combination thereof, wherein X=F, Cl, I, or Br, R=a hydrocarbon group, x=0-1, y=1-4.

In some embodiments, the high-elasticity polymer is a composite containing a lithium ion-conducting additive dispersed in a high-elasticity polymer matrix material, wherein the lithium ion-conducting additive contains a lithium salt selected from lithium perchlorate, LiClO$_4$, lithium hexafluorophosphate, LiPF$_6$, lithium borofluoride, LiBF$_4$, lithium hexafluoroarsenide, LiAsF$_6$, lithium trifluoro-metasulfonate, LiCF$_3$SO$_3$, bis-trifluoromethyl sulfonylimide lithium, LiN(CF$_3$SO$_2$)$_2$, lithium bis(oxalato)borate, LiBOB, lithium oxalyldifluoroborate, LiBF$_2$C$_2$O$_4$, lithium oxalyldifluoroborate, LiBF$_2$C$_2$O$_4$, lithium nitrate, LiNO$_3$, Li-Fluoroalkyl-Phosphates, LiPF$_3$(CF$_2$CF$_3$)$_3$, lithium bisperfluoroethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

The high-elasticity polymer may form a mixture, blend, co-polymer, or semi-interpenetrating network (semi-IPN) with an electron-conducting polymer selected from polyaniline, polypyrrole, polythiophene, polyfuran, a bi-cyclic polymer, derivatives thereof (e.g. sulfonated versions), or a combination thereof.

In some embodiments, the high-elasticity polymer may form a mixture, blend, or semi-IPN with a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof. Sulfonation is herein found to impart improved lithium ion conductivity to a polymer.

The present invention also provides a lithium battery containing an optional anode current collector, an anode active material layer, an invented cathode active material layer as described above, an optional cathode current collector, an electrolyte in ionic contact with the anode active material layer and the cathode active material layer and an optional porous separator. The lithium battery may be a lithium-ion battery or lithium metal battery (containing lithium metal or lithium alloy as the main anode active material and containing no intercalation-based anode active material), including lithium-selenium battery, but excluding alkali metal-sulfur battery and lithium-air battery.

The present invention also provides a powder product (a powder mass) containing a cathode active material for a lithium battery. The powder mass comprises multiple particulates wherein at least a particulate is composed of one or a plurality of cathode active material particles being fully embraced or encapsulated by a thin layer of a high-elasticity polymer having a recoverable tensile elastic strain from 2% to 700%, a lithium ion conductivity no less than $10^{-5}$ S/cm at room temperature, and a thickness from 0.5 nm to 10 µm. The powder mass may further comprise graphite particles, carbon particles, meso-phase microbeads, carbon or graphite fibers, carbon nanotubes, graphene sheets, or a combination thereof. In the powder mass, one or a plurality of cathode active material particles is coated with a layer of carbon or graphene disposed between the one or a plurality of particles and the high-elasticity polymer layer.

The present invention also provides a method of manufacturing a lithium battery. The method includes (a) providing a cathode active material layer and an optional cathode current collector to support the cathode active material layer; (b) providing an anode active material layer and an optional anode current collector to support the anode active material layer; and (c) providing an electrolyte in contact with the anode active material layer and the cathode active material layer and an optional separator electrically isolating (separating) the anode and the cathode; wherein the operation of providing the cathode active material layer includes fully embracing or encapsulating particles of a cathode active material by a high-elasticity polymer to form protected particulates, wherein the high-elasticity polymer has a recoverable tensile elastic strain from 2% to 700% (preferably >5% when measured without an additive or reinforcement), a lithium ion conductivity no less than $10^{-5}$ S/cm at room temperature, and a thickness from 0.5 nm to 10 µm (preferably from 1 to 100 nm).

This high-elasticity polymer encapsulation layer appears to be capable of isolating (preventing) liquid electrolyte from being in direct physical contact with the cathode active material and, thus, preventing the catalytic elements (e.g. Fe, Mn, Ni, Co, etc.) in the cathode active material from catalyzing the decomposition of the electrolyte. This otherwise could cause fast capacity decay and fire and explosion hazard. This high-elasticity polymer encapsulation layer also prevents dissolution of an organic or polymeric active material in the liquid electrolyte, which otherwise would lead to continuing loss of the active material and, thus, loss in capacity.

Preferably, the high-elasticity polymer has a lithium ion conductivity from $1\times10^{-5}$ S/cm to $5\times10^{-2}$ S/cm. In some embodiments, the high-elasticity polymer has a recoverable tensile strain from 10% to 300% (more preferably >30%, and further more preferably >50%).

In certain preferred embodiments, the high-elasticity polymer contains a cross-linked network polymer chains having an ether linkage, nitrile-derived linkage, benzo peroxide-derived linkage, ethylene oxide linkage, propylene oxide linkage, vinyl alcohol linkage, cyano-resin linkage, triacrylate monomer-derived linkage, tetraacrylate monomer-derived linkage, or a combination thereof in the cross-linked network of polymer chains. Preferably, in the method, the high-elasticity polymer contains a cross-linked network of polymer chains selected from nitrile-containing polyvinyl alcohol chains, cyanoresin chains, pentaerythritol tetraacrylate chains, pentaerythritol triacrylate chains, ethoxylated trimethylolpropane triacrylate (ETPTA) chains, ethylene glycol methyl ether acrylate (EGMEA) chains, or a combination thereof.

In certain embodiments, the polymer contains a mixture/blend/composite of a high-elasticity polymer with an elastomer, an electronically conductive polymer (e.g. polyaniline, polypyrrole, polythiophene, polyfuran, a bi-cyclic polymer, a sulfonated derivative thereof, or a combination thereof), a lithium-ion conducting material, a reinforcement material (e.g. carbon nanotube, carbon nano-fiber, and/or graphene), or a combination thereof.

In this mixture/blend/composite, the lithium ion-conducting material is dispersed in the high-elasticity polymer and is preferably selected from Li$_2$CO$_3$, Li$_2$O, Li$_2$C$_2$O$_4$, LiOH, LiX, ROCO$_2$Li, HCOLi, ROLi, (ROCO$_2$Li)$_2$, (CH$_2$OCO$_2$Li)$_2$, Li$_2$S, Li$_x$SO$_y$, or a combination thereof, wherein X=F, Cl, I, or Br, R=a hydrocarbon group, x=0-1, y=1-4.

In some embodiments, the lithium ion-conducting material is dispersed in the high-elasticity polymer and is selected from lithium perchlorate, LiClO$_4$, lithium hexafluoro-phosphate, LiPF$_6$, lithium borofluoride, LiBF$_4$, lithium hexafluoroarsenide, LiAsF$_6$, lithium trifluoro-metasulfonate, LiCF$_3$SO$_3$, bis-trifluoromethyl sulfonylimide lithium, LiN(CF$_3$SO$_2$)$_2$, lithium bis(oxalato)borate, LiBOB, lithium oxalyldifluoroborate, LiBF$_2$C$_2$O$_4$, lithium oxalyldifluoroborate, LiBF$_2$C$_2$O$_4$, lithium nitrate, LiNO$_3$, Li-Fluoroalkyl-Phosphates, LiPF$_3$(CF$_2$CF$_3$)$_3$, lithium bisperfluoro-ethysulfonylimide, LiBETI, lithium bis(trifluoromethanesulphonyl) imide, lithium bis(fluorosulphonyl)imide, lithium trifluoromethanesulfonimide, LiTFSI, an ionic liquid-based lithium salt, or a combination thereof.

Preferably, the cathode active material particles are coated with a layer of carbon or graphene prior to being bonded by the high-elasticity polymer. Preferably, cathode active material particles and particles of a carbon or graphite material are bonded together by the high-elasticity polymer. Preferably, the cathode active material particles, possibly along with a carbon or graphite material and/or with some internal graphene sheets, are embraced by graphene sheets to form cathode active material particulates, which are then bonded by the high-elasticity polymer. The graphene sheets may be selected from pristine graphene (e.g. that prepared by CVD or liquid phase exfoliation using direct ultrasonication), graphene oxide, reduced graphene oxide (RGO), graphene fluoride, doped graphene, functionalized graphene, etc.

DESCRIPTION OF THE PREFERRED EMBODIMENTS

This invention is directed at the cathode active material layer (positive electrode layer, not including the cathode current collector) containing a cathode active material in a protected particulate form for a lithium secondary battery, which is preferably a secondary battery based on a non-aqueous electrolyte, a polymer gel electrolyte, an ionic liquid electrolyte, a quasi-solid electrolyte, or a solid-state electrolyte. The shape of a lithium secondary battery can be cylindrical, square, button-like, etc. The present invention is not limited to any battery shape or configuration or any type of electrolyte.

Figure 1A:
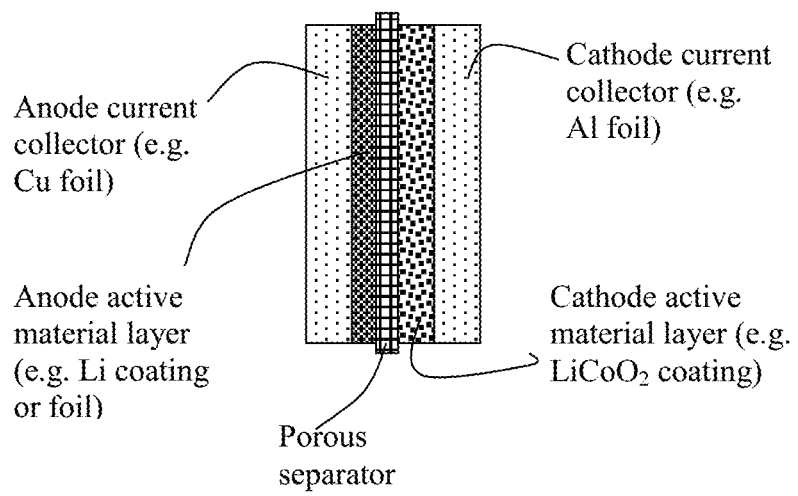
FIG. 1(A) Schematic of a prior art lithium-ion battery cell, wherein the anode layer is a thin coating of an anode active material (Li or lithiated Si) and the cathode is composed of particles of a cathode active material, a conductive additive (not shown) and a resin binder (not shown).
Figure 1B:
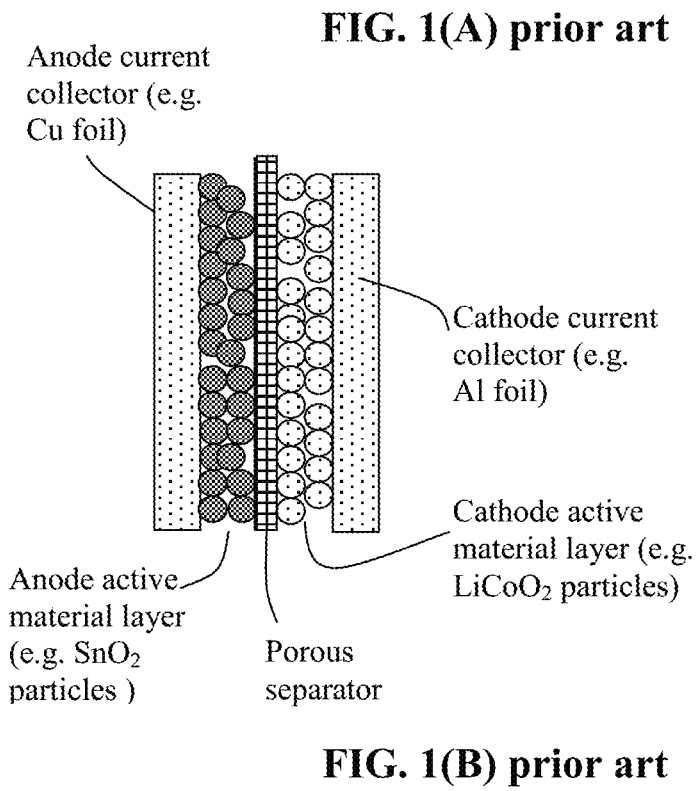
FIG. 1(B) Schematic of another prior art lithium-ion battery; the anode layer being composed of particles of an anode active material, a conductive additive (not shown) and a resin binder (not shown).

As illustrated in FIG. 1(B), a lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 μm thick (more typically 100-200 μm) to give rise to a sufficient amount of current per unit electrode area. Similarly, the cathode layer is composed of particles of a cathode active material (e.g. $LiCoO_2$, $LiMnO_4$, $LiFePO_4$, etc.), a conductive additive (e.g. carbon black particles), and a resin binder (e.g. PVDF or PTFE). This cathode layer is typically 100-300 μm thick.

In a lithium metal cell, as illustrated in FIG. 1(A), the anode active material is deposited in a thin film form or a thin foil form directly onto an anode current collector. If a layer of Li coating or Li foil is used as the anode active material, the battery is a lithium metal battery, lithium sulfur battery, lithium-air battery, lithium-selenium battery, etc.

In order to obtain a higher energy density lithium-ion cell, the anode in FIG. 1(B) can be designed to contain higher-capacity anode active materials having a composition formula of $Li_aA$ (A is a metal or semiconductor element, such as Al and Si, and "a" satisfies $0<a\le5$). These materials are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g).

Figure 2A:
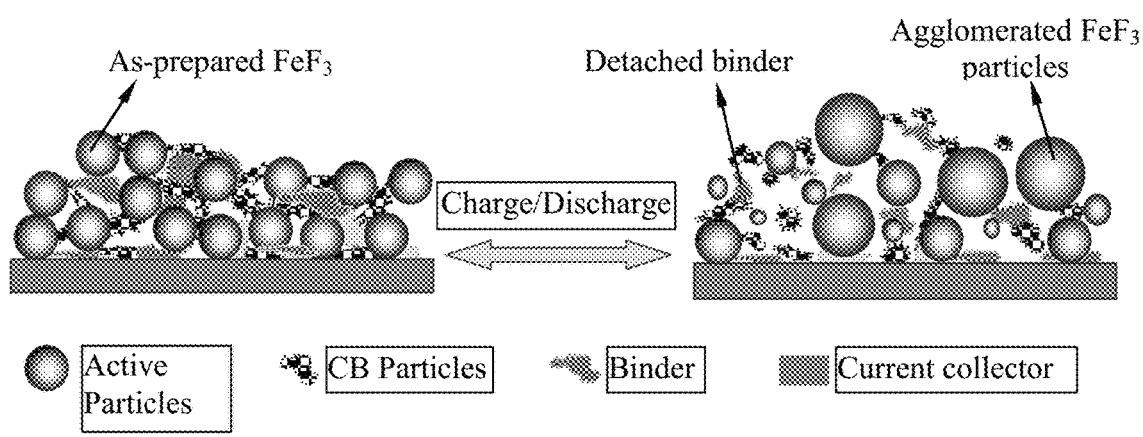
FIG. 2(A) Schematic illustrating the notion that expansion/shrinkage of electrode active material particles, upon lithium insertion and de-insertion during discharge/charge of a prior art lithium-ion battery, can lead to detachment of resin binder from the particles, interruption of the conductive paths formed by the conductive additive, and loss of contact with the current collector.

As schematically illustrated in FIG. 2(A), one major problem in the current lithium battery is the notion that active material particles can get fragmented and the binder resin can detach from both the active material particles and conductive additive particles due to volume expansion/shrinkage of the active material particles during the charge and discharge cycles. These binder detachment and particle fragmentation phenomena lead to loss of contacts between active material particles and conductive additives and loss of contacts between the anode active material and its current collector. These adverse effects result in a significantly shortened charge-discharge cycle life.

We have solved these challenging issues that have troubled battery designers and electrochemists alike for more than 30 years by developing a new class of cathode active materials. The cathode active material layer comprises multiple cathode active material particles that are fully embraced or encapsulated by a high-elasticity polymer having a recoverable (elastic) tensile strain no less than 2% under uniaxial tension and a lithium ion conductivity no less than $10^{-5}$ S/cm at room temperature (preferably and more typically from $1\times10^{-5}$ S/cm to $5\times10^{-2}$ S/cm).

Figure 2B:
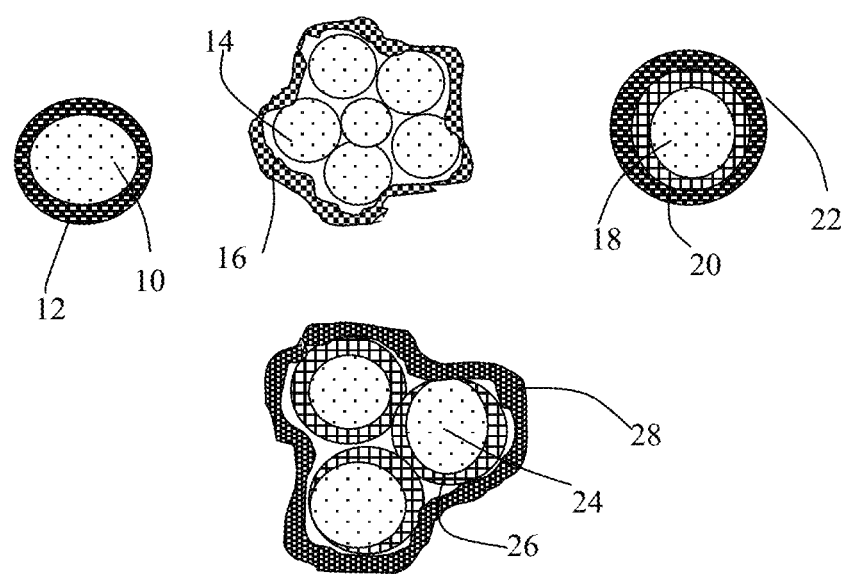
FIG. 2(B) Several different types of particulates containing high-elasticity polymer encapsulated cathode active material particles.

As illustrated in FIG. 2(B), the present invention provides four major types of particulates of high-elasticity polymer-encapsulated cathode active material particles. The first one is a single-particle particulate containing a cathode active material core 10 encapsulated by a high-elasticity polymer shell 12. The second is a multiple-particle particulate containing multiple cathode active material particles 14 (e.g. $FeF_3$ particles), optionally along with other conductive materials (e.g. particles of graphite or hard carbon, not shown), which are encapsulated by a high-elasticity polymer 16. The third is a single-particle particulate containing a cathode active material core 18 coated by a carbon or graphene layer 20 (or other conductive material) further encapsulated by a high-elasticity polymer 22. The fourth is a multiple-particle particulate containing multiple cathode active material particles 24 (e.g. $FeF_3$ particles) coated with a conductive protection layer 26 (carbon, graphene, etc.), optionally along with other active materials or conductive additive, which are encapsulated by a high-elasticity polymer shell 28.

High-elasticity polymer refers to a polymer, typically a lightly cross-linked polymer, which exhibits an elastic deformation that is at least 5% when measured (without an additive or reinforcement in the polymer) under uniaxial tension. In the field of materials science and engineering, the "elastic deformation" is defined as a deformation of a material (when being mechanically stressed) that is essentially fully recoverable and the recovery is essentially instantaneous upon release of the load. The elastic deformation is preferably greater than 5%, more preferably greater than 100%, further more preferably greater than 50%, still more preferably greater than 100%, and most preferably greater than 200%. The preferred types of high-capacity polymers will be discussed later.

The application of the presently invented high-elasticity polymer encapsulation approach is not limited to any particular class of cathode active materials. The cathode active material layer may contain a cathode active material selected from an inorganic material, an organic material, a polymeric material, or a combination thereof. The inorganic material may be selected from a metal oxide, metal phosphate, metal silicide, metal selenide, transition metal sulfide, or a combination thereof.

The inorganic material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

In certain preferred embodiments, the inorganic material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof. In certain preferred embodiments, the inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y\leq 1$.

In certain preferred embodiments, the inorganic material is selected from a transition metal dichalcogenide, a transition metal trichalcogenide, or a combination thereof. The inorganic material is selected from $TiS_2$, $TaS_2$, $MoS_2$, $NbSe_3$, $MnO_2$, $CoO_2$, an iron oxide, a vanadium oxide, or a combination thereof.

The cathode active material layer may contain a metal oxide containing vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphthylene (HATN), Hexaazatriphenylene hexacarbonitrile ($HAT(CN)_6$), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4 5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The particles of the anode active material may be in the form of a nano particle, nano wire, nano fiber, nano tube, nano sheet, nano platelet, nano disc, nano belt, nano ribbon, or nano horn. They can be non-lithiated (when incorporated into the anode active material layer) or pre-lithiated to a desired extent (up to the maximum capacity as allowed for a specific element or compound.

Preferably and typically, the high-elasticity polymer has a lithium ion conductivity no less than $10^{-5}$ S/cm, more preferably no less than $10^{-4}$ S/cm, further preferably no less than $10^{-3}$ S/cm, and most preferably no less than $10^{-2}$ S/cm. In some embodiments, the high-elasticity polymer is a neat polymer having no additive or filler dispersed therein. In others, the high-elasticity polymer is a polymer matrix composite containing from 0.1% to 50% (preferably 1% to 35%) by weight of a lithium ion-conducting additive dispersed in a high-elasticity polymer matrix material. The high-elasticity polymer must have a high elasticity (elastic deformation strain value >2%). An elastic deformation is a deformation that is fully recoverable and the recovery process is essentially instantaneous (no significant time delay). The high-elasticity polymer can exhibit an elastic deformation from 5% up to 1,000% (10 times of its original length), more typically from 10% to 800%, and further more typically from 50% to 500%, and most typically and desirably from 70% to 300%. It may be noted that although a metal typically has a high ductility (i.e. can be extended to a large extent without breakage), the majority of the deformation is plastic deformation (non-recoverable) and only a small amount of elastic deformation (typically <1% and more typically <0.2%).

In some preferred embodiments, the high-elasticity polymer contains a lightly cross-linked network polymer chains having an ether linkage, nitrile-derived linkage, benzo peroxide-derived linkage, ethylene oxide linkage, propylene oxide linkage, vinyl alcohol linkage, cyano-resin linkage, triacrylate monomer-derived linkage, tetraacrylate monomer-derived linkage, or a combination thereof, in the cross-linked network of polymer chains. These network or cross-linked polymers exhibit a unique combination of a high elasticity (high elastic deformation strain) and high lithium-ion conductivity.

In certain preferred embodiments, the high-elasticity polymer contains a lightly cross-linked network polymer chains selected from nitrile-containing polyvinyl alcohol chains, cyanoresin chains, pentaerythritol tetraacrylate (PETEA) chains, pentaerythritol triacrylate chains, ethoxylated trimethylolpropane triacrylate (ETPTA) chains, ethylene glycol methyl ether acrylate (EGMEA) chains, or a combination thereof.

Typically, a high-elasticity polymer is originally in a monomer or oligomer states that can be cured to form a cross-linked polymer that is highly elastic. Prior to curing, these polymers or oligomers are soluble in an organic solvent to form a polymer solution. Particles of a cathode active material (e.g. lithium metal oxide, lithium metal fluoride, etc.) can be dispersed in this polymer solution to form a suspension (dispersion or slurry). This suspension can then be spray-dried to form secondary particles or particulates that contain active material particles being fully embraced by an encapsulation layer of polymer precursor. The polymer precursor (monomer or oligomer and initiator) embracing the particles are then polymerized and cured to form a lightly cross-linked polymer. Spray-drying is only one of several encapsulation techniques that can be used to fully embrace active material particles. These techniques will be discussed later.

For instance, ethoxylated trimethylopropane triacrylate monomer (ETPTA, Mw=428, chemical formula given below), along with an initiator, can be dissolved in an organic solvent, such as ethylene carbonate (EC) or diethyl carbonate (DEC). Then, cathode active material particles can be dispersed in the ETPTA monomer/solvent/initiator solution to form a slurry, which can be spray-dried to form ETPTA monomer/initiator-embraced cathode active material particles. These embraced particles can then be thermally cured to obtain the particulates composed of cathode particles encapsulated with a thin layer of a high-elasticity polymer. The polymerization and cross-linking reactions of this monomer can be initiated by a radical initiator derived from benzoyl peroxide (BPO) or AIBN through thermal decomposition of the initiator molecule. The ETPTA monomer has the following chemical formula:

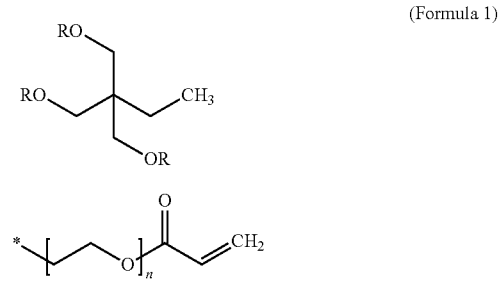

(Formula 1)

As another example, the high-elasticity polymer for encapsulation may be based on cationic polymerization and cross-linking of the cyanoethyl polyvinyl alcohol (PVA-CN, Formula 2) in succinonitrile (SN).

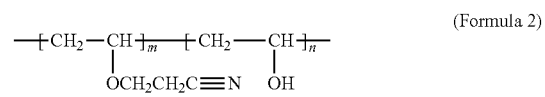

(Formula 2)

The procedure may begin with dissolving PVA-CN in succinonitrile ($NCCH_2CH_2CN$) to form a mixture solution. This is followed by adding an initiator into the mixture solution. For instance, $LiPF_6$ can be added into the PVA-CN/SN mixture solution at a weight ratio (selected from the preferred range from 20:1 to 2:1) to form a precursor solution. Then, particles of a selected cathode active material are introduced into the mixture solution to form a slurry. The slurry may then be subjected to a micro-encapsulation procedure to produce active material particles coated with an embracing layer of reacting mass, PVA-CN/$LiPF_6$. These embraced particles can then be heated at a temperature (e.g. from 75 to 100° C.) for 2 to 8 hours to obtain high-elasticity polymer-encapsulated cathode active material particles. During this process, cationic polymerization and cross-linking of cyano groups on the PVA-CN may be initiated by $PF_5$, which is derived from the thermal decomposition of $LiPF_6$ at such an elevated temperature.

It is essential for these materials to form a lightly cross-linked network of polymer chains. In other words, the network polymer or cross-linked polymer should have a relatively low degree of cross-linking or low cross-link density to impart a high elastic deformation.

The cross-link density of a cross-linked network of polymer chains may be defined as the inverse of the molecular weight between cross-links (Mc). The cross-link density can be determined by the equation, Mc=ρRT/Ge, where Ge is the equilibrium modulus as determined by a temperature sweep in dynamic mechanical analysis, p is the physical density, R is the universal gas constant in J/mol*K and T is absolute temperature in K. Once Ge and ρ are determined experimentally, then Mc and the cross-link density can be calculated.

The magnitude of Mc may be normalized by dividing the Mc value by the molecular weight of the characteristic repeat unit in the cross-link chain or chain linkage to obtain a number, Nc, which is the number of repeating units between two cross-link points. We have found that the elastic deformation strain correlates very well with Mc and. Nc. The elasticity of a cross-linked polymer derives from a large number of repeating units (large Nc) between cross-links. The repeating units can assume a more relax conformation (e.g. random coil) when the polymer is not stressed. However, when the polymer is mechanically stressed, the linkage chain uncoils or gets stretched to provide a large deformation. A long chain linkage between cross-link points (larger Nc) enables a larger elastic deformation. Upon release of the load, the linkage chain returns to the more relaxed or coiled state. During mechanical loading of a polymer, the cross-links prevent slippage of chains that otherwise form plastic deformation (non-recoverable).

Preferably, the Nc value in a high-elasticity polymer is greater than 5, more preferably greater than 10, further more preferably greater than 100, and even more preferably greater than 200. These Nc values can be readily controlled and varied to achieve different elastic deformation values by using different cross-linking agents with different functionalities, and by designing the polymerization and cross-linking reactions to proceed at different temperatures for different periods of time.

Alternatively, Mooney-Rilvin method may be used to determine the degree of cross-linking. Crosslinking also can be measured by swelling experiments. In a swelling experiment, the crosslinked sample is placed into a good solvent for the corresponding linear polymer at a specific temperature, and either the change in mass or the change in volume is measured. The higher the degree of crosslinking, the less swelling is attainable. Based on the degree of swelling, the Flory Interaction Parameter (which relates the solvent interaction with the sample, Flory Huggins Eq.), and the density of the solvent, the theoretical degree of crosslinking can be calculated according to Flory's Network Theory. The Flory-Rehner Equation can be useful in the determination of cross-linking.

The high-elasticity polymer may contain a simultaneous interpenetrating network (SIN) polymer, wherein two cross-linking chains intertwine with each other, or a semi-interpenetrating network polymer (semi-IPN), which contains a cross-linked polymer and a linear polymer. An example of semi-IPN is an UV-curable/polymerizable trivalent/monovalent acrylate mixture, which is composed of ethoxylated trimethylolpropane triacrylate (ETPTA) and ethylene glycol methyl ether acrylate (EGMEA) oligomers. The ETPTA, bearing trivalent vinyl groups, is a photo (UV)-crosslinkable monomer, capable of forming a network of cross-linked chains. The EGMEA, bearing monovalent vinyl groups, is also UV-polymerizable, leading to a linear polymer with a high flexibility due to the presence of the oligomer ethylene oxide units. When the degree of cross-linking of ETPTA is moderate or low, the resulting ETPTA/EGMEA semi-IPN polymer provides good mechanical flexibility or elasticity and reasonable mechanical strength. The lithium-ion conductivity of this polymer is in the range of $10^{-4}$ to $5\times10^{-3}$ S/cm.

The aforementioned high-elasticity polymers may be used alone to encapsulate the cathode active material particles. Alternatively, the high-elasticity polymer can be mixed with a broad array of elastomers, electrically conducting polymers, lithium ion-conducting materials, and/or strengthening materials (e.g. carbon nanotube, carbon nano-fiber, or graphene sheets).

A broad array of elastomers can be mixed with a high-elasticity polymer to form a blend, co-polymer, or interpenetrating network that encapsulates the cathode active material particles. The elastomeric material may be selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

The urethane-urea copolymer film usually consists of two types of domains, soft domains and hard ones. Entangled linear backbone chains consisting of poly (tetramethylene ether) glycol (PTMEG) units constitute the soft domains, while repeated methylene diphenyl diisocyanate (MDI) and ethylene diamine (EDA) units constitute the hard domains. The lithium ion-conducting additive can be incorporated in the soft domains or other more amorphous zones.

In some embodiments, a high-elasticity polymer can form a polymer matrix composite containing a lithium ion-conducting additive dispersed in the high-elasticity polymer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4.

In some embodiments, the high-elasticity polymer can be mixed with a lithium ion-conducting additive, which contains a lithium salt selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

The high-elasticity polymer may form a mixture, blend, or semi-interpenetrating network with an electron-conducting polymer selected from polyaniline, polypyrrole, polythiophene, polyfuran, a bi-cyclic polymer, derivatives thereof (e.g. sulfonated versions), or a combination thereof.

In some embodiments, the high-elasticity polymer may form a mixture, co-polymer, or semi-interpenetrating network with a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazene, polyvinyl chloride, polydimethylsiloxane, poly(vinylidene fluoride)-hexafluoropropylene (PVDF-HFP), a derivative thereof (e.g. sulfonated versions), or a combination thereof Unsaturated rubbers that can be mixed with the high-elasticity polymer include natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), Some elastomers are saturated rubbers that cannot be cured by sulfur vulcanization; they are made into a rubbery or elastomeric material via different means: e.g. by having a copolymer domain that holds other linear chains together. Each of these elastomers can be used to bond particles of a cathode active material by one of several means; e.g. spray coating, dilute solution mixing (dissolving the cathode active material particles in an uncured polymer, monomer, or oligomer, with or without an organic solvent) followed by drying and curing.

Saturated rubbers and related elastomers in this category include EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, and protein elastin. Polyurethane and its copolymers (e.g. urea-urethane copolymer) are particularly useful elastomeric shell materials for encapsulating anode active material particles.

Several micro-encapsulation processes may be used to encapsulate particles of an active material. These processes typically require the high-elasticity polymer or its precursor (monomer or oligomer) to be dissolvable in a solvent. Fortunately, all the high-elasticity polymers or their precursors used herein are soluble in some common solvents. The un-cured polymer or its precursor can be readily dissolved in a common organic solvent to form a solution. This solution can then be used to encapsulate solid particles via several of the micro-encapsulation methods to be discussed in what follows. Upon encapsulation, the polymer shell is then polymerized and cross-linked.

There are three broad categories of micro-encapsulation methods that can be implemented to produce high-elasticity polymer-encapsulated particles of an active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-coating method: The pan coating process involves tumbling the active material particles in a pan or a similar device while the encapsulating material (e.g. monomer/oligomer, polymer melt, polymer/solvent solution) is applied slowly until a desired encapsulating shell thickness is attained.

Air-suspension coating method: In the air suspension coating process, the solid particles (core material) are dispersed into the supporting air stream in an encapsulating chamber. A controlled stream of a polymer-solvent solution (polymer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with a polymer or its precursor molecules while the volatile solvent is removed, leaving a very thin layer of polymer (or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal extrusion: Particles of an active material may be encapsulated using a rotating extrusion head containing concentric nozzles. In this process, a stream of core fluid (slurry containing particles of an active material dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle method: Core-shell encapsulation or matrix-encapsulation of an active material can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the active material. The solidification can be done according to the used gelation system with an internal gelation (e.g. sol-gel processing, melt) or an external (additional binder system, e.g. in a slurry).

Spray-drying: Spray drying may be used to encapsulate particles of an active material when the active material is dissolved or suspended in a melt or polymer solution. In spray drying, the liquid feed (solution or suspension) is atomized to form droplets which, upon contacts with hot gas, allow solvent to get vaporized and thin polymer shell to fully embrace the solid particles of the active material.

Coacervation-phase separation: This process consists of three steps carried out under continuous agitation:
(a) Formation of three immiscible chemical phases: liquid manufacturing vehicle phase, core material phase and encapsulation material phase. The core material is dispersed in a solution of the encapsulating polymer (or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.
(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and
(c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form a polymer shell material.

In-situ polymerization: In some micro-encapsulation processes, active materials particles are fully coated with a monomer or oligomer first. Then, direct polymerization and cross-linking of the monomer or oligomer is carried out on the surfaces of these material particles.

Matrix polymerization: This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

EXAMPLE 1

Cathode Active Material Layers Containing High-elasticity Polymer-encapsulated $V_2O_5$ Particles Cathode active material layers were prepared from $V_2O_5$ particles and graphene-embraced $V_2O_5$ particles, respectively. $V_2O_5$ particles were commercially available. Graphene-embraced $V_2O_5$ particles were prepared in-house. In a typical experiment, vanadium pentoxide gels were obtained by mixing $V_2O_5$ in a LiCl aqueous solution. The $Li^+$-exchanged gels obtained by interaction with LiCl solution (the Li:V molar ratio was kept as 1:1) was mixed with a GO suspension and then placed in a Teflon-lined stainless steel 35 ml autoclave, sealed, and heated up to 180° C. for 12 h. After such a hydrothermal treatment, the green solids were collected, thoroughly washed, ultrasonicated for 2 minutes, and dried at 70° C. for 12 h followed by mixing with another 0.1% GO in water, ultrasonicating to break down nano-belt sizes, and then spray-drying at 200° C. to obtain graphene-embraced $V_2O_5$ composite particulates.

Selected amounts of $V_2O_5$ particles and graphene-embraced $V_2O_5$ particles, respectively, were then each made into ETPTA-based high-elasticity polymer-encapsulated particulates according to the following procedure: The ethoxylated trimethylopropane triacrylate monomer (ETPTA, Mw=428, Sigma-Aldrich) was dissolved in a solvent mixture of ethylene carbonate (EC)/diethyl carbonate (DEC), at a weight-based composition ratios of the ETPTA/solvent of 3/97 (w/w). Subsequently, benzoyl peroxide (BPO, 1.0 wt. % relative to the ETPTA content) was added as a radical initiator to allow for thermal crosslinking reaction after mixing with anode particles. Then, cathode active material particles were dispersed in the ETPTA monomer/solvent/initiator solution to form a slurry, which was spray-dried to form fully separated/isolated particulates containing active material particles fully embraced by a layer of ETPTA monomer/initiator. These particulates were then thermally cured at 60° C. for 30 min to obtain a cathode active material containing $V_2O_5$ particles or graphene-embraced $V_2O_5$ particles that are fully embraced by a high-elasticity polymer-based encapsulation shell.

On a separate basis, some amount of the ETPTA monomer/solvent/initiator solution was cast onto a glass surface to form a wet film, which was thermally dried and then cured at 60° C. for 30 min to form a film of cross-linked polymer. In this experiment, the BPO/ETPTA weight ratio was varied from 0.1% to 4% to vary the degree of cross-linking in several different polymer films. Some of the cure polymer samples were subjected to dynamic mechanical testing to obtain the equilibrium dynamic modulus, Ge, for the determination of the number average molecular weight between two cross-link points (Mc) and the corresponding number of repeat units (Nc), as a means of characterizing the degree of cross-linking.

Figure 3A:
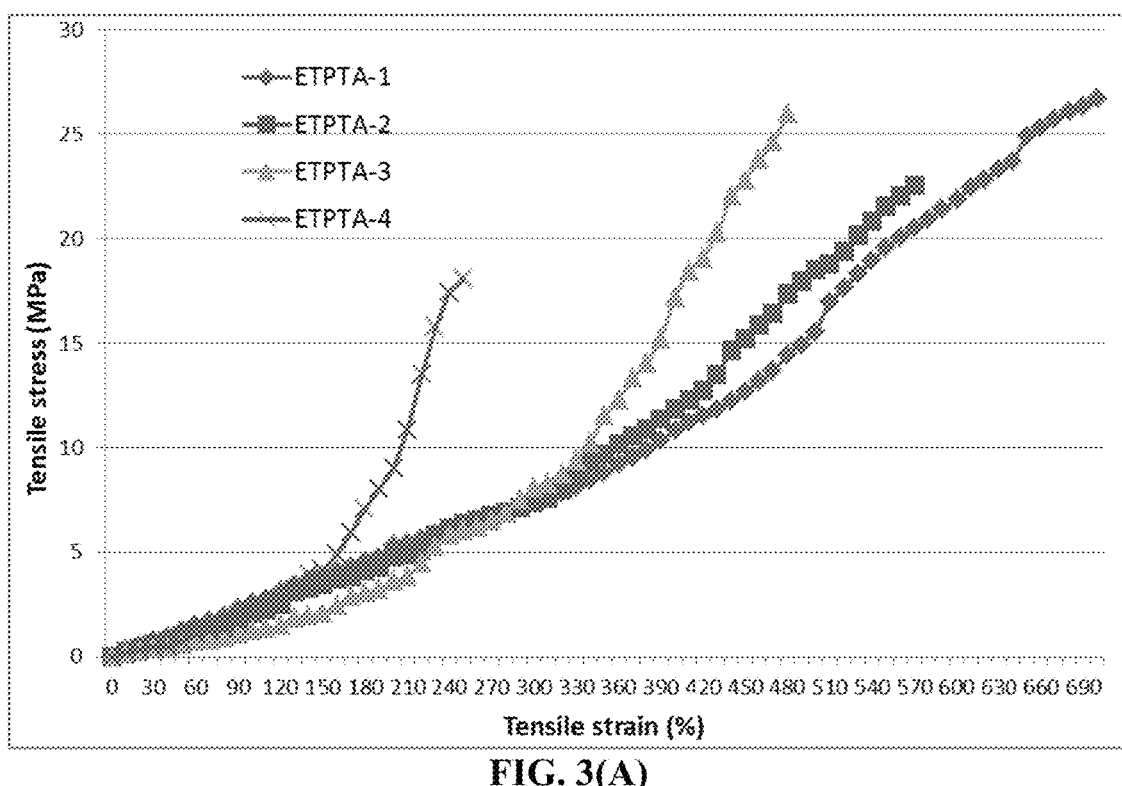
FIG. 3(A) Representative tensile stress-strain curves of four BPO-initiated cross-linked ETPTA polymers.

Several tensile testing specimens were cut from each cross-link film and tested with a universal testing machine. The representative tensile stress-strain curves of four BPO-initiated cross-linked ETPTA polymers are shown in FIG. 3(A), which indicate that this series of network polymers have an elastic deformation from approximately 230% to 700%. These above are for neat polymers without any additive. The addition of up to 30% by weight of a lithium salt typically reduces this elasticity down to a reversible tensile strain from 10% to 100%.

For electrochemical testing, a comparative electrode using a conventional cathode (no encapsulation) was also prepared. The working electrodes were prepared by mixing 85 wt. % $V_2O_5$ or 88% of graphene-embraced $V_2O_5$ particles), 5-8 wt. % CNTs, and 7 wt. % polyvinylidene fluoride (PVDF) binder dissolved in N-methyl-2-pyrrolidinoe (NMP) to form a slurry of 5 wt. % total solid content. After coating the slurries on Al foil, the electrodes were dried at 120° C. in vacuum for 2 h to remove the solvent before pressing. Then, the electrodes were cut into a disk ($\phi$=12 mm) and dried at 100° C. for 24 h in vacuum.

Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s. The electrochemical performance of the cell featuring high-elasticity polymer binder and that containing PVDF binder were evaluated by galvanostatic charge/discharge cycling at a current density of 50 mA/g using an Arbin electrochemical workstation.

Figure 3B:
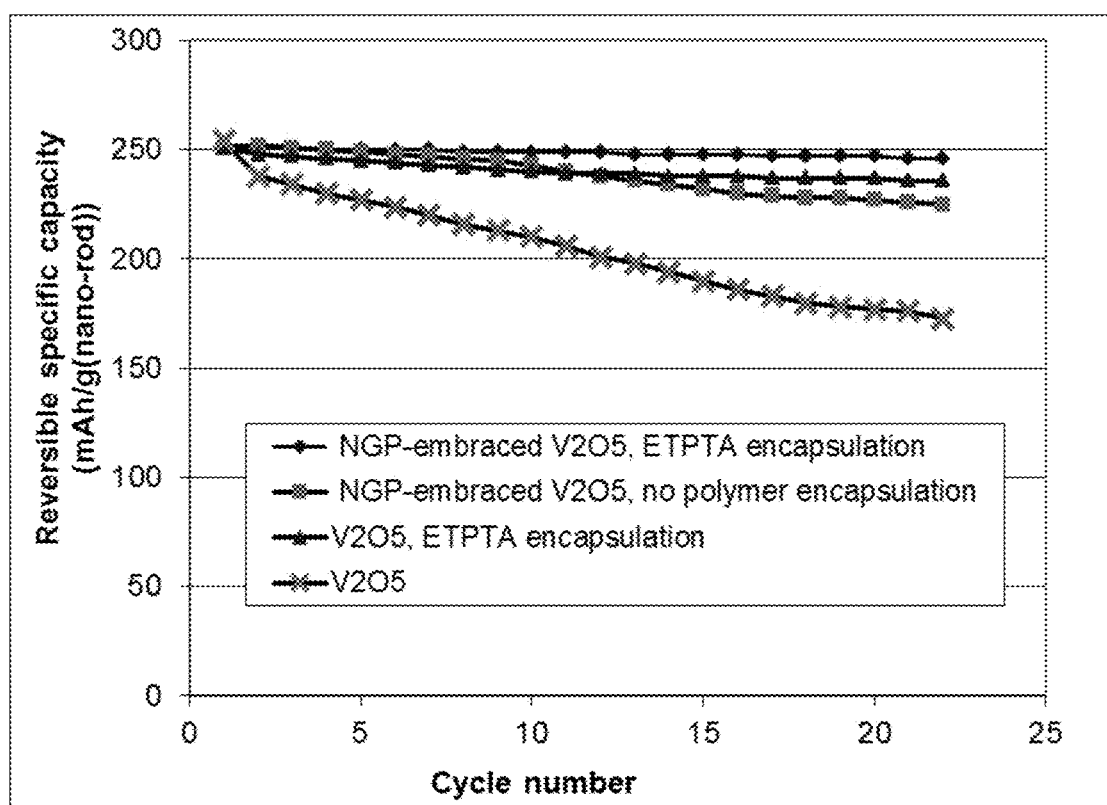
FIG. 3(B) The specific intercalation capacity curves of four lithium cells: cathode containing un-encapsulated $V_2O_5$ particles, cathode containing un-encapsulated but graphene-embraced $V_2O_5$ particles, cathode containing ETPTA polymer-encapsulated $V_2O_5$ particles, and cathode containing ETPTA polymer-encapsulated graphene-embraced $V_2O_5$ particles.

Summarized in FIG. 3(B) are the specific intercalation capacity curves of four lithium cells: cathode containing un-encapsulated $V_2O_5$ particles, cathode containing un-encapsulated but graphene-embraced $V_2O_5$ particles, cathode containing ETPTA polymer-encapsulated $V_2O_5$ particles, and cathode containing ETPTA polymer-encapsulated graphene-embraced $V_2O_5$ particles. As the number of cycles increases, the specific capacity of the un-encapsulated $V_2O_5$ electrode drops at the fastest rate. In contrast, the presently invented high-elasticity polymer encapsulation provides the battery cell with a significantly more stable and high specific capacity for a large number of cycles. These data have clearly demonstrated the surprising and superior performance of the presently invented high-elasticity polymer encapsulation approach.

The high-elasticity polymer encapsulation shell appears to be capable of reversibly deforming to a great extent without breakage when the active material particles expand and shrink. The polymer also remains chemically bonded to the binder resin when the encapsulated particles expand or shrink. In contrast, the PVDF binder is broken or detached from some of the non-encapsulated active material particles. These were observed by using SEM to examine the surfaces of the electrodes recovered from the battery cells after some numbers of charge-discharge cycles.

EXAMPLE 2

High-elasticity Polymer Binder-bonded Lithium Iron Phosphate (LFP) Particles

The high-elasticity polymer for encapsulating LFP particles was based on cationic polymerization and cross-linking of the cyanoethyl polyvinyl alcohol (PVA-CN) in succinonitrile (SN). The procedure began with dissolving PVA-CN in succinonitrile to form a mixture solution. This step was followed by adding an initiator into the solution. For the purpose of incorporating some lithium species into the high elasticity polymer, we chose to use $LiPF_6$ as an initiator. The ratio between $LiPF_6$ and the PVA-CN/SN mixture solution was varied from 1/20 to 1/2 by weight to form a series of precursor solutions. Subsequently, carbon-coated LFP particles were introduced into these solutions to form a series of slurries. The slurries were then separately subjected to ultrasonic spraying to produce a mass of encapsulated particulates, which was then heated at a temperature from 75 to 100° C. for 2 to 8 hours to obtain a powder sample of high-elasticity polymer-encapsulated cathode active material particles.

Figure 4A:
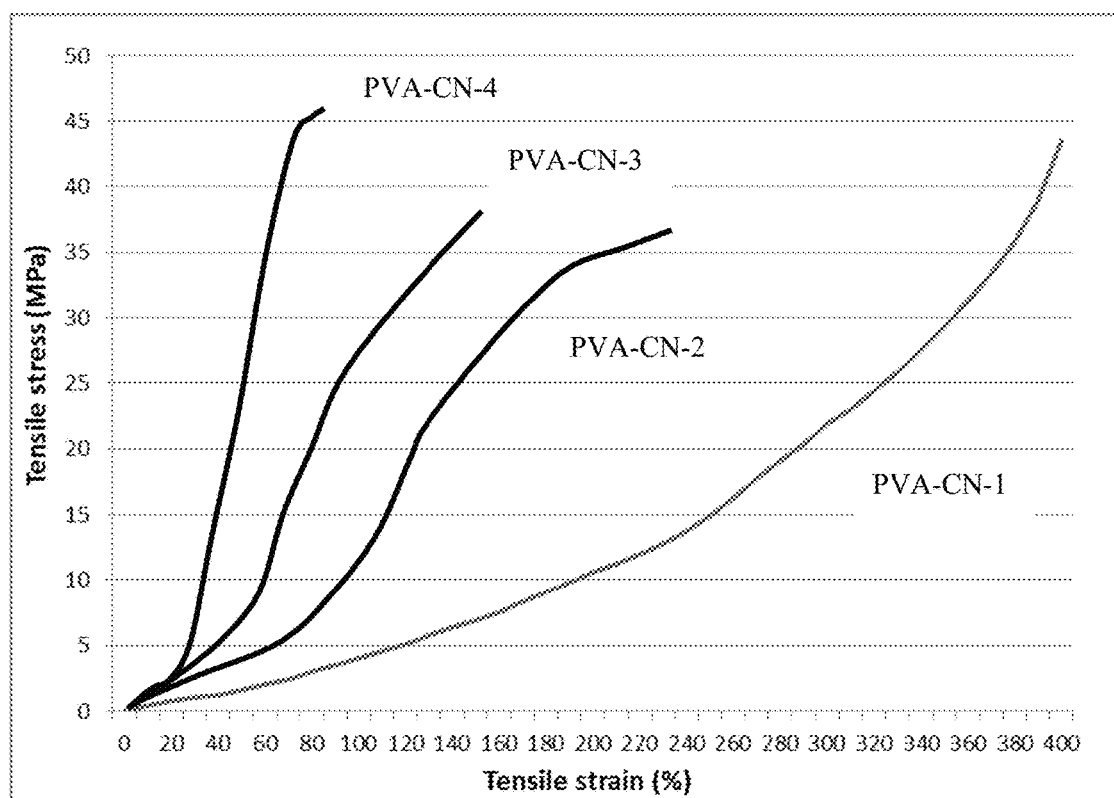
FIG. 4(A) Representative tensile stress-strain curves of four PF5-initiated cross-linked PVA-CN polymers.

Additionally, the reacting mass, PVA-CN/$LiPF_6$, was cast onto a glass surface to form several films which were polymerized and cross-linked to obtain cross-linked polymers having different degrees of cross-linking. Tensile testing was also conducted on these films and some testing results are summarized in FIG. 4(a). This series of cross-linked polymers can be elastically stretched up to approximately 80% (higher degree of cross-linking) to 400% (lower degree of cross-linking).

Figure 4B:
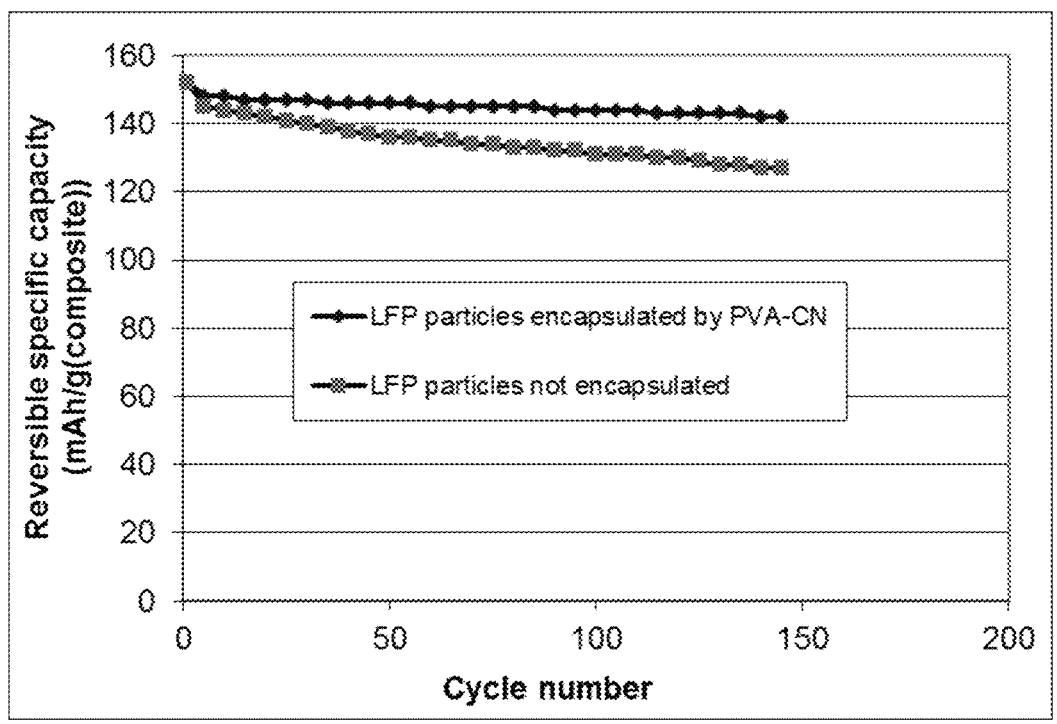
FIG. 4(B) The specific capacity values of two lithium battery cells having a cathode active material featuring (1) high-elasticity PVA-CN polymer-encapsulated carbon-coated $LiFePO_4$ particles and (2) carbon-coated $LiFePO_4$ particles without polymer encapsulation, respectively.

The battery cells from the high-elasticity polymer-encapsulated carbon-coated LFP particles and non-encapsulated carbon-coated LFP particles were prepared using a procedure described in Example 1. FIG. 4(B) shows that the cathode prepared according to the presently invented high-elasticity polymer encapsulation approach offers a significantly more stable cycling behavior and higher reversible capacity compared to the non-encapsulated LFP particle-based cathode. The high-elasticity polymer is more capable of holding the active material particles and conductive additive together, significantly improving the structural integrity of the active material electrode. The high-elasticity polymer also acts to isolate the electrolyte from the active material yet still allowing for easy diffusion of lithium ions.

EXAMPLE 3

Metal Fluoride Nano Particles Encapsulated by a PETEA-based High-elasticity Polymer For serving as an encapsulation shell resin for $FeF_3$ nano particles, pentaerythritol tetraacrylate (PETEA), Formula 3, was used as a monomer:

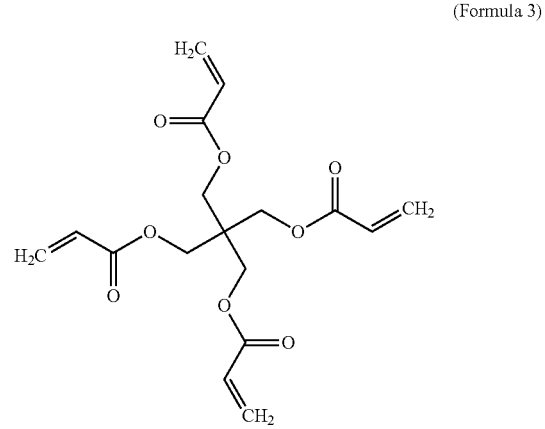 [SMILES: C=CC(=O)OCC(COC(=O)C=C)(COC(=O)C=C)COC(=O)C=C]

(Formula 3)

Commercially available powders of $CoF_3$, $MnF_3$, $FeF_3$, $VF_3$, $VOF_3$, $TiF_3$, and $BiF_3$ were subjected to high-intensity ball-milling to reduce the particle size down to approximately 0.5-2.3 μm. Each type of these metal fluoride particles, along with graphene sheets (as a conductive additive), was then added into a PETEA monomer liquid suspension to form a multiple-component slurry. The slurry was then spray-dried to form isolated polymer precursor-embraced particles, which were then cured. In a representative procedure, the precursor solution was composed of 1.5 wt. % PETEA ($C_{17}H_{20}O_8$) monomer and 0.1 wt. % azodiisobutyronitrile (AIBN, $C_8H_{12}N_4$) initiator dissolved in a solvent mixture of 1,2-dioxolane (DOL)/dimethoxymethane (DME) (1:1 by volume). The PETEA/AIBN precursor solution was polymerized and cured at 70° C. for half an hour to obtain powder of encapsulated metal fluoride particles/graphene.

Figure 5A:
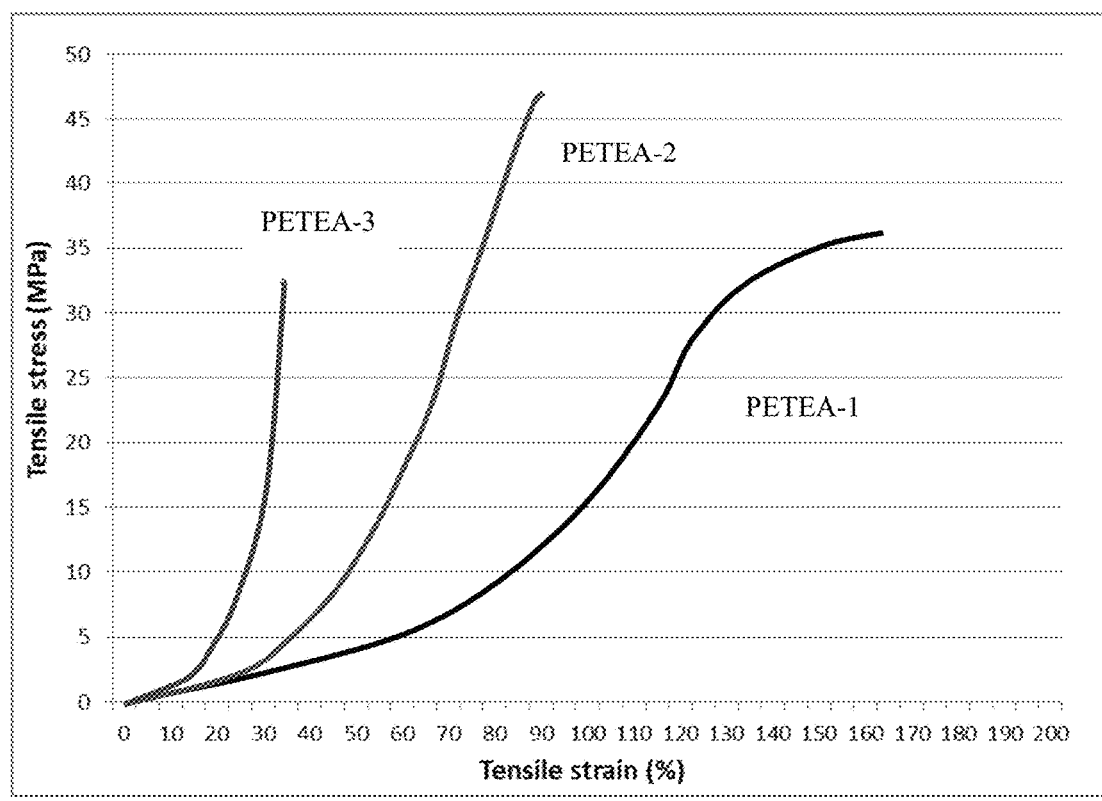
FIG. 5(A) Representative tensile stress-strain curves of three cross-linked PETEA polymers FIG. 5(B) The discharge capacity curves of two coin cells having two different types of cathode active materials: (1) high-elasticity PETEA polymer encapsulated metal fluoride particles and (2) non-encapsulated metal fluorides.

Additionally, the reacting mass, PETEA/AIBN (without active particles and conductive additive), was cast onto a glass surface to form several films which were polymerized and cured to obtain cross-linked polymers having different degrees of cross-linking. Tensile testing was also conducted on these films and some testing results are summarized in FIG. 5(A). This series of cross-linked polymers can be elastically stretched up to approximately 25% (higher degree of cross-linking) to 80% (lower degree of cross-linking)

Figure 5B:
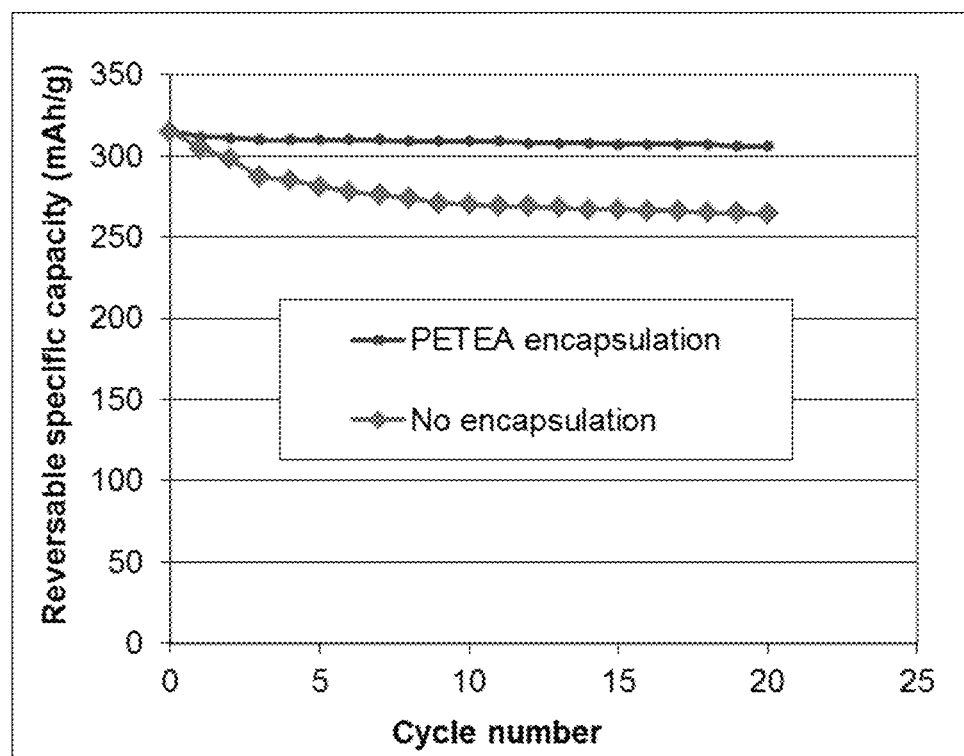

Shown in FIG. 5(B) are the discharge capacity curves of two coin cells having two different types of cathode active materials: (1) high-elasticity PETEA polymer encapsulated metal fluoride particles and (2) non-encapsulated metal fluorides. These results have clearly demonstrated that the high-elasticity polymer encapsulation strategy provides excellent protection against capacity decay of a lithium metal battery featuring a high-capacity cathode active material.

The high-elasticity polymer appears to be capable of reversibly deforming without breakage when the cathode active material particles expand and shrink. The polymer also remains chemically bonded to the binder resin when the active particles expand or shrink. In contrast, both SBR and PVDF, the two conventional binder resins, are broken or detached from some of the non-encapsulated active material particles. The high-elasticity polymer has contributed to the structural stability of the electrode layer. These were observed by using SEM to examine the surfaces of the electrodes recovered from the battery cells after some numbers of charge-discharge cycles.

EXAMPLE 4

Metal Naphthalocyanine-reduced Graphene Oxide (FePc/RGO) Hybrid Particulates Encapsulated by a High-elasticity Polymer Particles of combined FePc/graphene sheets were obtained by ball-milling a mixture of FePc and RGO in a milling chamber for 30 minutes. The resulting FePc/RGO mixture particles were potato-like in shape. Some of these mixture particles were encapsulated by a high-elasticity polymer using the pan-coating procedure. Two lithium cells were prepared, each containing a Li foil anode, a porous separator, and a cathode layer of FePc/RGO particles (encapsulated or un-encapsulated).

For preparation of an ETPTA semi-IPN polymer, the ETPTA (Mw=428 g/mol, trivalent acrylate monomer), EGMEA (Mw=482 g/mol, monovalent acrylate oligomer), and 2-hydroxy-2-methyl-1-phenyl-1-propanone (HMPP, a photoinitiator) were dissolved in a solvent (propylene carbonate, PC) to form a solution. The weight ratio between HMPP and the ETPTA/EGMEA mixture was varied from 0.2% to 2%. The ETPTA/EGMEA proportion in the solution was varied from 1% to 5% to generate different encapsulation shell thicknesses. The ETPTA/EGMEA ratio in the acrylate mixture was varied from 10/0 to 1/9.

Pan-coating was used to encapsulate the cathode particles with ETPTA/EGMEA/HMPP, which was then exposed to UV irradiation for 20 s. The UV polymerization/cross-linking was conducted using a Hg UV lamp (100 W), having a radiation peak intensity of approximately 2000 $mW/cm^2$ on the surfaces of the electrodes.

Figure 6:
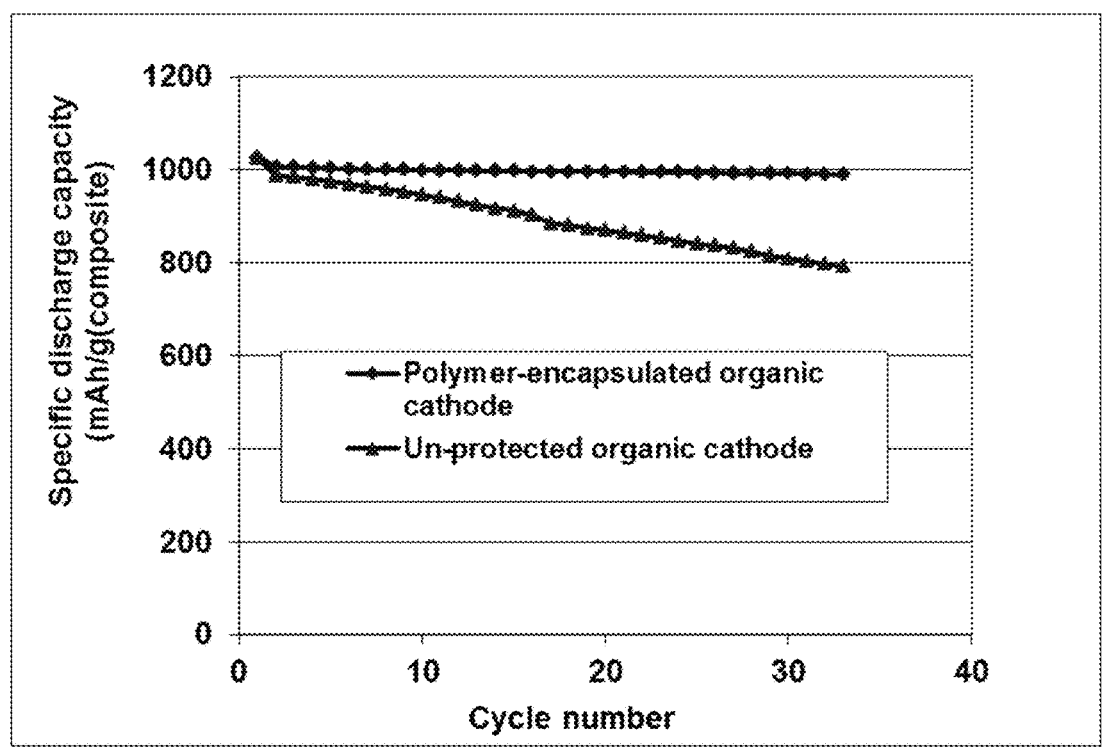
FIG. 6 Specific capacities of two lithium-FePc (organic) cells, each having Li as an anode active material and FePc/RGO mixture particles as the cathode active material (one cell containing un-encapsulated particles and the other containing particles encapsulated by a cross-linked ETPTA/ EGMEA polymer).

The cycling behaviors of these 2 lithium cells are shown in FIG. 6, which indicates that the lithium-organic cell having a high-elasticity polymer-encapsulated particulates in the cathode layer exhibits a significantly more stable cycling response. This encapsulation polymer reduces or eliminates direct contact between the catalytic transition metal element (Fe) and the electrolyte, yet still being permeable to lithium ions. This polymer also completely eliminates the dissolution of naphthalocyanine compounds in the liquid electrolyte. This approach has significantly increased the cycle life of all lithium-organic batteries.

EXAMPLE 5

Effect of Lithium Ion-conducting Additive in a High-elasticity Polymer

A wide variety of lithium ion-conducting additives were added to several different polymer matrix materials to prepare encapsulation polymers for maintaining structural integrity of electrodes and improving cycling stability of lithium batteries (Table 1). We have discovered that these polymer composite materials are all suitable encapsulation materials. These polymer composites all have a lithium ion conductivity at room temperature no less than $10^{-5}$ S/cm.

TABLE 1

Lithium ion conductivity of various high-elasticity polymer composite compositions as a shell material for protecting anode active material particles.

| Sample No. | Lithium-conducting additive | Elastomer (1-2 μm thick) | Li-ion conductivity (S/cm) |
| --- | --- | --- | --- |
| E-1b | $Li_2CO_3$ + $(CH_2OCO_2Li)_2$ | 70-99% PVA-CN | $2.9 \times 10^{-4}$ to $3.6 \times 10^{-3}$ S/cm |
| E-2b | $Li_2CO_3$ + $(CH_2OCO_2Li)_2$ | 65-99% ETPTA | $6.4 \times 10^{-4}$ to $2.3 \times 10^{-3}$ S/cm |
| E-3b | $Li_2CO_3$ + $(CH_2OCO_2Li)_2$ | 65-99% ETPTA/EGMEA | $8.4 \times 10^{-4}$ to $1.8 \times 10^{-3}$ S/cm |
| D-4b | $Li_2CO_3$ + $(CH_2OCO_2Li)_2$ | 70-99% PETEA | $7.8 \times 10^{-3}$ to $2.3 \times 10^{-2}$ S/cm |
| D-5b | $Li_2CO_3$ + $(CH_2OCO_2Li)_2$ | 75-99% PVA-CN | $8.9 \times 10^{-4}$ to $5.5 \times 10^{-3}$ S/cm |
| B1b | LiF + LiOH + $Li_2C_2O_4$ | 60-90% PVA-CN | $8.7 \times 10^{-5}$ to $2.3 \times 10^{-3}$ S/cm |
| B2b | LiF + HCOLi | 80-99% PVA-CN | $2.8 \times 10^{-4}$ to $1.6 \times 10^{-3}$ S/cm |
| B3b | LiOH | 70-99% PETEA | $4.8 \times 10^{-3}$ to $1.2 \times 10^{-2}$ S/cm |
| B4b | $Li_2CO_3$ | 70-99% PETEA | $4.4 \times 10^{-3}$ to $9.9 \times 10^{-3}$ S/cm |
| B5b | $Li_2C_2O_4$ | 70-99% PETEA | $1.3 \times 10^{-3}$ to $1.2 \times 10^{-2}$ S/cm |
| B6b | $Li_2CO_3$ + LiOH | 70-99% PETEA | $1.4 \times 10^{-3}$ to $1.6 \times 10^{-2}$ S/cm |

TABLE 1-continued

Lithium ion conductivity of various high-elasticity polymer composite compositions as a shell material for protecting anode active material particles.

| Sample No. | Lithium-conducting additive | Elastomer (1-2 μm thick) | Li-ion conductivity (S/cm) |
|---|---|---|---|
| C1b | LiClO$_4$ | 70-99% PVA-CN | $4.5 \times 10^{-4}$ to $2.4 \times 10^{-3}$ S/cm |
| C2b | LiPF$_6$ | 70-99% PVA-CN | $3.4 \times 10^{-4}$ to $7.2 \times 10^{-3}$ S/cm |
| C3b | LiBF$_4$ | 70-99% PVA-CN | $1.1 \times 10^{-4}$ to $1.8 \times 10^{-3}$ S/cm |
| C4b | LiBOB + LiNO$_3$ | 70-99% PVA-CN | $2.2 \times 10^{-4}$ to $4.3 \times 10^{-3}$ S/cm |
| S1b | Sulfonated polyaniline | 85-99% ETPTA | $9.8 \times 10^{-5}$ to $9.2 \times 10^{-4}$ S/cm |
| S2b | Sulfonated SBR | 85-99% ETPTA | $1.2 \times 10^{-4}$ to $1.0 \times 10^{-3}$ S/cm |
| S3b | Sulfonated PVDF | 80-99% ETPTA/EGMEA | $3.5 \times 10^{-4}$ to $2.1 \times 10^{-4}$ S/cm |
| S4b | Polyethylene oxide | 80-99% ETPTA/EGMEA | $4.9 \times 10^{-4}$ to $3.7 \times 10^{3 \, 4}$ S/cm |

EXAMPLE 6

Cycle Stability of Various Rechargeable Lithium Battery Cells

In lithium-ion battery industry, it is a common practice to define the cycle life of a battery as the number of charge-discharge cycles that the battery suffers 20% decay in capacity based on the initial capacity measured after the required electrochemical formation. Summarized in Table 2 below are the cycle life data of a broad array of batteries featuring presently invented electrodes containing anode active material particles bonded by different binder materials.

TABLE 3

Cycle life data of various lithium secondary (rechargeable) batteries.

| Sample ID | Encapsulation polymer | Type & % of cathode active material | Initial capacity (mAh/g) | Cycle life (No. of cycles) |
|---|---|---|---|---|
| CuCl$_2$-1e | PVA-CN | 85% by wt. CuCl$_2$ particles (80 nm) + 7% graphite + 8% binder | 530 | 1435 |
| CuCl$_2$-2e | none | 85% by wt. CuCl$_2$ particles (80 nm) + 7% graphite + 8% binder | 527 | 113 |
| BiF$_3$-1e | none | 85% by wt. BiF$_3$ particles + 7% graphene + 8% binder | 275 | 115 |
| BiF$_3$-2e | PVA-CN + 50% ethylene oxide | 85% by wt. BiF$_3$ particles + 7% graphene + 8% binder | 276 | 1,266 |
| Li$_2$MnSiO$_4$-1e | ETPTA | 85% C-coated Li$_2$MnSiO$_4$ + 7% CNT + 8% binder | 252 | 2,576 |
| Li$_2$MnSiO$_4$-2e | none | 85% C-coated Li$_2$MnSiO$_4$ + 7% CNT + 8% binder | 252 | 543 |
| Li$_6$C$_6$O$_6$-1e | ETPTA/EGMEA + 20% polyanniline | Li$_6$C$_6$O$_6$-graphene ball-milled | 440 | 1,163 |
| Li$_6$C$_6$O$_6$-2e | none | Li$_6$C$_6$O$_6$-graphene ball-milled | 438 | 116 |
| MoS$_2$-1e | PETEA | 85% MoS$_2$ + 8% graphite platelets + binder | 225 | 1,664 |
| MoS$_2$-2e | none | 85% MoS$_2$ + 8% graphite platelets + binder | 225 | 156 |

These data further confirm that the high-elasticity polymer encapsulation strategy is surprisingly effective in alleviating the cathode structural instability-induced capacity decay problems. The high-elasticity polymer encapsulation layer appears to be capable of preventing liquid electrolyte from being in direct physical contact with the cathode active material and, thus, preventing the catalytic elements (e.g. Fe, Mn, Ni, Co, etc.) in the cathode active material from catalyzing the decomposition of the electrolyte to form volatile or flammable gas molecules inside the battery cell. This otherwise could cause fast capacity decay and fire and explosion hazard. The high-elasticity polymer encapsulation layer also prevents dissolution of an organic or polymeric active material in the liquid electrolyte, which otherwise would lead to loss of the active material and, thus, capacity loss.

We claim:

1. A cathode active material layer for a lithium battery, said cathode active material layer comprising multiple particulates of cathode active material, wherein each said particulate includes at least one cathode active material particle, and each said particulate is fully and separately encapsulated by a thin layer of a high-elasticity polymer wherein said high elasticity polymer has a recoverable tensile strain from 2% to 700% when measured without an additive or reinforcement, a lithium ion conductivity no less than $10^{-5}$ S/cm at room temperature, and a thickness from 0.5 nm to 10 μm, and wherein said lithium battery is selected from a lithium-ion battery or lithium metal battery, excluding metal-air and metal-sulfur battery.

2. The cathode active material layer of claim 1, wherein said high-elasticity polymer contains a cross-linked network of polymer chains having an ether linkage, nitrile-derived linkage, benzo peroxide-derived linkage, ethylene oxide linkage, propylene oxide linkage, vinyl alcohol linkage, cyano-resin linkage, triacrylate monomer-derived linkage, tetraacrylate monomer-derived linkage, or a combination thereof in said cross-linked network of polymer chains.

3. The cathode active material layer of claim 1, wherein said high-elasticity polymer contains a cross-linked network of polymer chains selected from nitrile-containing polyvinyl alcohol chains, cyanoresin chains, pentaerythritol tetraacrylate chains, pentaerythritol triacrylate chains, ethoxylated trimethylolpropane triacrylate (ETPTA) chains, ethylene glycol methyl ether acrylate (EGMEA) chains, or a combination thereof.

4. The cathode active material layer of claim 1, wherein said cathode active material is selected from an inorganic material, an organic material, a polymeric material, or a combination thereof, and said inorganic material does not include sulfur or alkali metal polysulfide.

5. The cathode active material layer of claim 4, wherein said inorganic material is selected from a metal oxide, metal phosphate, metal silicide, metal selenide, transition metal sulfide, or a combination thereof.

6. The cathode active material layer of claim 4, wherein said inorganic material is selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

7. The cathode active material layer of claim 4, wherein said inorganic material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof.

8. The cathode active material layer of claim 4, wherein said inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y<1$.

9. The cathode active material layer of claim 4, wherein said inorganic material is selected from a transition metal dichalcogenide, a transition metal trichalcogenide, or a combination thereof.

10. The cathode active material layer of claim 4, wherein said inorganic material is selected from $TiS_2$, $TaS_2$, $MoS_2$, $NbSe_3$, $MnO_2$, $CoO_2$, an iron oxide, a vanadium oxide, or a combination thereof.

11. The cathode active material layer of claim 5, wherein said metal oxide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$.

12. The cathode active material layer of claim 5, wherein said metal oxide or metal phosphate is selected from a layered compound $LiMO_2$, spinel compound $LiM_2O_4$, olivine compound $LiMPO_4$, silicate compound $Li_2MSiO_4$, tavorite compound $LiMPO_4F$, borate compound $LiMBO_3$, or a combination thereof, wherein M is a transition metal or a mixture of multiple transition metals.

13. The cathode active material layer of claim 5, wherein said inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

14. The cathode active material layer of claim 4, wherein said organic material or polymeric material is selected from poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound (PYT), quino(triazene), redox-active organic material, tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, hexaazatrinaphtylene (HATN), hexaazatriphenylene hexacarbonitrile (HAT(CN)$_6$), 5-benzylidene hydantoin, isatine lithium salt, pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

15. The cathode active material layer of claim 14, wherein said thioether polymer is selected from poly[methanetetryltetra(thiomethylene)] (PMTTM), poly(2,4-dithiopentanylene) (PDTP), a polymer containing poly(ethene-1,1,2,2-tetrathiol) (PETT) as a main-chain thioether polymers, a side-chain thioether polymer having a main-chain consisting of conjugating aromatic moieties, and having a thioether side chain as a pendant, poly(2-phenyl-1,3-dithiolane) (PPDT), poly(1,4-di(1,3-dithiolan-2-yl)benzene) (PDDTB), poly(tetrahydrobenzodithiophene) (PTHBDT), poly[1,2,4,5-tetrakis(propylthio)benzene](PTKPTB , or poly [3,4(ethylenedithio)thiophene] (PEDTT).

16. The cathode active material layer of claim 4, wherein said organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

17. The cathode active material layer of claim 1, wherein said cathode active material is in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

18. The cathode active material layer of claim 1, wherein said cathode active material particles are coated with a layer of carbon or graphene.

19. The cathode active material layer of claim 1, wherein a conductive additive coats each said particle, and said conductive additive is selected from graphite, graphene, or carbon, or a combination thereof.

20. The cathode active material layer of claim 19, wherein said graphite or carbon material is selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof.

21. The cathode active material layer of claim 17, wherein said nanoparticle, nanowire, nanofiber, nanotube, nanosheet, nanobelt, nanoribbon, nanodisc, nanoplatelet, or nanohorn is coated with or embraced by a conductive protective coating selected from a carbon material, graphene, electronically conductive polymer, conductive metal oxide, or conductive metal coating.

22. The cathode active material layer of claim 1, wherein said high-elasticity polymer has a lithium ion conductivity from $1\times10^{-5}$ S/cm to $5\times10^{-2}$ S/cm.

23. The cathode active material layer of claim 1, wherein said high-elasticity polymer is a neat polymer having no additive or filler dispersed therein.

24. The cathode active material layer of claim 1, wherein said high-elasticity polymer contains from 0.1% to 50% by weight of a lithium ion-conducting additive dispersed therein, or contains therein from 0.1% by weight to 10% by weight of a reinforcement nanofilament selected from carbon nanotube, carbon nanofiber, graphene, or a combination thereof.

25. The cathode active material layer of claim 1, wherein said high-elasticity polymer forms a mixture or interpenetrating network with an elastomer selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

26. The cathode active material layer of claim 1, wherein said high-elasticity polymer is mixed with a lithium ion-conducting additive to form a composite wherein said lithium ion-conducting additive is dispersed in said high-elasticity polymer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

27. The cathode active material layer of claim 1, wherein said high-elasticity polymer is mixed with a lithium ion-conducting additive to form a composite wherein said lithium ion-conducting additive is dispersed in said high-elasticity polymer and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis (oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), li-fluoroalkyl-phosphates ($LiPF_3(CF_2CF_3)_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

28. The cathode active material layer of claim 1, wherein said high-elasticity polymer is mixed with an electron-conducting polymer selected from polyaniline, polypyrrole, polythiophene, polyfuran, a bi-cyclic polymer, a sulfonated derivative thereof, or a combination thereof to form a blend, co-polymer, or semi-interpenetrating network.

29. The cathode active material layer of claim 1, wherein the high-elasticity polymer forms a mixture, blend, copolymer, or semi-interpenetrating network with a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof.

30. A powder mass of a cathode active material for a lithium battery, said powder mass comprising multiple particulates of cathode active material; wherein each said particulate is composed of at least one cathode active material particle, and each said particulate is fully and separately encapsulated by a thin layer of a high-elasticity polymer having a recoverable tensile elastic strain from 2% to 700%, a lithium ion conductivity no less than $10^{-5}$ S/cm at room temperature, and a thickness from 0.5 nm to 10 μm.

31. The powder mass of claim 30, further comprising graphite particles, carbon particles, mesophase microbeads, carbon or graphite fibers, carbon nanotubes, graphene sheets, or a combination thereof.

32. The powder mass of claim 30, wherein said cathode active material particles are coated with a layer of carbon or graphene disposed between said particles and said high-elasticity polymer layer.

33. A lithium battery containing an anode current collector, an anode active material layer, a cathode active material layer as defined in claim 1, a cathode current collector, an electrolyte in ionic contact with said anode active material layer and said cathode active material layer, and a porous separator.

34. The lithium battery of claim 33, which is a lithium-ion battery or lithium metal battery.

35. A method of manufacturing a lithium battery, said method comprising:
  (a) providing a cathode active material layer and a cathode current collector to support said cathode active material layer;
  (b) providing an anode active material layer and an anode current collector to support said anode active material layer; and
  (c) providing an electrolyte in contact with the anode active material layer and the cathode active material layer and a separator electrically separating the anode and the cathode;
  wherein the operation of providing the cathode active material layer includes providing multiple particulates, wherein each said particulate is composed of at least one cathode active material particle, and each said particulate is fully and separately encapsulated by a thin layer of a high-elasticity polymer having a recoverable tensile elastic strain from 2% to 700%, a lithium ion conductivity no less than $10^{-5}$ S/cm at room temperature, and a thickness from 0.5 nm to 10 μm;
  wherein each said particulate is fully and separately encapsulated by the polymer layer independently of the cathode current collector.

36. The method of claim 35, wherein said high-elasticity polymer has a lithium ion conductivity from $1\times10^{-5}$ S/cm to $2\times10^{-2}$ S/cm.

37. The method of claim 35, wherein said high-elasticity polymer has a recoverable tensile strain from 5% to 300%.

38. The method of claim 35, wherein said high-elasticity polymer contains a cross-linked network polymer chains having an ether linkage, nitrile-derived linkage, benzo peroxide-derived linkage, ethylene oxide linkage, propylene oxide linkage, vinyl alcohol linkage, cyano-resin linkage, triacrylate monomer-derived linkage, tetraacrylate monomer-derived linkage, or a combination thereof in said cross-linked network of polymer chains.

39. The method of claim 35, wherein said high-elasticity polymer contains a cross-linked network of polymer chains selected from nitrile-containing polyvinyl alcohol chains, cyanoresin chains, pentaerythritol tetraacrylate chains, pentaerythritol triacrylate chains, ethoxylated trimethylolpropane triacrylate (ETPTA) chains, ethylene glycol methyl ether acrylate (EGMEA) chains, or a combination thereof.

40. The method of claim 35, wherein said high-elasticity polymer forms a mixture with an elastomer, an electronically conductive polymer, a lithium-ion conducting material, a reinforcement material, or a combination thereof.

41. The method of claim 40, wherein said lithium ion-conducting material is dispersed in said high-elasticity polymer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

42. The method of claim 40, wherein said lithium ion-conducting material is dispersed in said high-elasticity polymer and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), li-fluoroalkyl-phosphates ($LiPF_3(CF_2CF_3)_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

43. The method of claim 35, wherein said cathode active material is selected from an inorganic material, organic material, polymeric material, or a combination thereof and wherein said inorganic material does not include sulfur or alkali metal polysulfide.

44. The method of claim 35, wherein said cathode active material particles are coated with a layer of carbon or graphene.

45. The method of claim 35, wherein said cathode active material particles are mixed with a carbon, graphene, or graphite material to form a mixture and said mixture is embraced by at least one graphene sheet.

46. The method of claim 35, wherein said multiple cathode active material particles are mixed with a carbon material, a graphite material, and/or graphene sheets to form a mixture that is embraced by external graphene sheets to form graphene-embraced cathode active material particulates, which are then encapsulated by a high-elasticity polymer.

* * * * *